United States Patent
Bai et al.

(10) Patent No.: US 12,452,716 B2
(45) Date of Patent: Oct. 21, 2025

(54) TECHNIQUES FOR CLI REPORTING TRIGGER CONDITIONS

(71) Applicant: QUALCOMM Incorporated, San Diego, CA (US)

(72) Inventors: Tianyang Bai, Somerville, NJ (US); Yan Zhou, San Diego, CA (US); Qian Zhang, Basking Ridge, NJ (US); Junyi Li, Fairless Hills, PA (US); Tao Luo, San Diego, CA (US)

( * ) Notice: Subject to any disclaimer, the term of this patent is extended or adjusted under 35 U.S.C. 154(b) by 608 days.

(21) Appl. No.: 17/715,668

(22) Filed: Apr. 7, 2022

(65) Prior Publication Data

US 2023/0328563 A1    Oct. 12, 2023

(51) Int. Cl.
- *H04W 24/10* (2009.01)
- *H04B 17/336* (2015.01)
- *H04W 72/0453* (2023.01)
- *H04W 72/20* (2023.01)
- *H04W 72/541* (2023.01)

(52) U.S. Cl.
CPC .......... *H04W 24/10* (2013.01); *H04B 17/336* (2015.01); *H04W 72/0453* (2013.01); *H04W 72/20* (2023.01); *H04W 72/541* (2023.01)

(58) Field of Classification Search
CPC ............... H04W 24/10; H04W 72/541; H04W 72/0453; H04W 72/20; H04B 17/336
See application file for complete search history.

(56) References Cited

U.S. PATENT DOCUMENTS

| | | | |
|---|---|---|---|
| 2020/0169341 A1* | 5/2020 | Hwang | H04W 24/10 |
| 2021/0067991 A1* | 3/2021 | Zhu | H04W 8/24 |
| 2022/0014954 A1 | 1/2022 | Ibrahim et al. | |

FOREIGN PATENT DOCUMENTS

WO   WO-2018228421 A1 *  12/2018   ........... H04B 17/336

OTHER PUBLICATIONS

Huawei., et al., "On the Impact of DRX on CLI SRS-RSRP Measurement", 3GPP TSG-RAN2 Meeting #110 electronic, R2-2005309, 3rd Generation Partnership Project, Mobile Competence Centre, 650, Route Des Lucioles, F-06921, Sophia-Antipolis Cedex, France, vol. RAN WG2, No. electronic; Jun. 1, 2020-Jun. 12, 2020, May 21, 2020, XP051887589, 28 pages, section 2.1, 2.2, Alternative 1, The whole document, figure 1, paragraph [02.1], paragraph [02.2].

(Continued)

*Primary Examiner* — Elton Williams

(57) ABSTRACT

Methods, systems, and devices for wireless communications are described. A first user equipment (UE) (e.g., "victim" UE) may receive control signaling indicating a cross-link interference (CLI) reporting configuration associated with a set of CLI resources, where the CLI resources are associated with varying levels of CLI at the first UE. The first UE may perform CLI measurements on signals received from a second UE (e.g., "aggressor" UE) within the set of CLI interference resources based on the CLI reporting configuration. The first UE may then transmit, based on the CLI measurements, a CLI report identifying a CLI resource from the set of CLI resources, wherein the CLI resource is associated with a CLI measurement that fails to satisfy a CLI threshold, or wherein the CLI resource is associated with a lower level of CLI as compared to other CLI resources within the set of CLI resources.

30 Claims, 16 Drawing Sheets

(56) References Cited

OTHER PUBLICATIONS

International Search Report and Written Opinion—PCT/US2023/015486—ISA/EPO—Jun. 19, 2023 (2202526WO).
Nokia, et al., "UE CLI Measurement Configuration and Reporting", 3GPP TSG-RAN2#107, R2-1909023, 3rd Generation Partnership Project (3GPP), Mobile Competence Centre, 650, Route Des Lucioles, F-06921 Sophia-Antipolis Cedex, France, vol. RAN WG2, No. Prague, Czech Republic; Aug. 26, 2019-Aug. 30, 2019, Aug. 15, 2019, XP051766833, 11 Pages.

\* cited by examiner

TECHNIQUES FOR CLI REPORTING TRIGGER CONDITIONS

FIELD OF TECHNOLOGY

The following relates to wireless communications, including techniques for cross-link interference (CLI) reporting trigger conditions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications systems, UEs may be configured to measure cross-link interference (CLI) attributable to signals received from other UEs. For example, a "victim" UE may experience CLI from signals transmitted by an "aggressor" UE in cases where uplink communications transmitted by the aggressor UE collide with downlink communications received by the victim UE. Left unaddressed, CLI may lead to increased noise, and reduce an efficiency and reliability of wireless communications.

SUMMARY

The described techniques relate to improved methods, systems, devices, and apparatuses that support techniques for cross-link interference (CLI) reporting trigger conditions. Generally, aspects of the present disclosure support signaling and techniques which enable victim user equipments (UEs) to report least-interfering CLI resources to the network. In other words, aspects of the present disclosure are directed to CLI reporting techniques that enable victim UEs to report CLI resources with the least CLI (e.g., X least-interfering CLI resources), CLI resources that exhibit CLI below some threshold, or both. For example, a victim UE may receive a CLI reporting configuration for reporting CLI resources below some threshold, reporting a quantity of least-interfering CLI resources, or both. The victim UE may then perform CLI measurements on signals received from other UEs (e.g., aggressor UEs), and transmit a CLI report indicating a quantity of least-interfering CLI resources, CLI resources that exhibit low CLI (e.g., CLI below a threshold), or both. In some cases, certain conditions may trigger victim UEs to report least-interfering CLI resources. A trigger condition for CLI reporting may be satisfied if any CLI resource exhibits CLI less than some threshold CLI. Victim UEs may report actual CLI measurements for the least-interfering CLI resources, or only report CLI identifiers associated with the least-interfering CLI resources. Trigger conditions for reporting a least-interfering CLI resource may be based on an average CLI measurement across the CLI resource (wideband reporting), or based on a CLI measurement of at least one sub-band within the CLI resource (sub-band reporting).

A method for wireless communication at a first UE is described. The method may include receiving control signaling indicating a CLI reporting configuration associated with a set of CLI resources, the set of CLI resources including at least a first CLI resource and a second CLI resource, where the first CLI resource is associated with a first level of CLI and the second CLI resource is associated with a second level of CLI that is less than the first level, performing CLI measurements on signals received from a second UE within the set of CLI resources based on the CLI reporting configuration, and transmitting, based on performing the CLI measurements, a CLI report identifying a CLI resource from the set of CLI resources, where the CLI resource is associated with a CLI measurement that fails to satisfy a CLI threshold, or where the CLI resource is associated with at least the second CLI resource associated with the second level of CLI.

An apparatus for wireless communication at a first UE is described. The apparatus may include a processor, memory coupled with the processor, and instructions stored in the memory. The instructions may be executable by the processor to cause the apparatus to receive control signaling indicating a CLI reporting configuration associated with a set of CLI resources, the set of CLI resources including at least a first CLI resource and a second CLI resource, where the first CLI resource is associated with a first level of CLI and the second CLI resource is associated with a second level of CLI that is less than the first level, perform CLI measurements on signals received from a second UE within the set of CLI resources based on the CLI reporting configuration, and transmit, based on performing the CLI measurements, a CLI report identifying a CLI resource from the set of CLI resources, where the CLI resource is associated with a CLI measurement that fails to satisfy a CLI threshold, or where the CLI resource is associated with at least the second CLI resource associated with the second level of CLI.

Another apparatus for wireless communication at a first UE is described. The apparatus may include means for receiving control signaling indicating a CLI reporting configuration associated with a set of CLI resources, the set of CLI resources including at least a first CLI resource and a second CLI resource, where the first CLI resource is associated with a first level of CLI and the second CLI resource is associated with a second level of CLI that is less than the first level, means for performing CLI measurements on signals received from a second UE within the set of CLI resources based on the CLI reporting configuration, and means for transmitting, based on performing the CLI measurements, a CLI report identifying a CLI resource from the set of CLI resources, where the CLI resource is associated with a CLI measurement that fails to satisfy a CLI threshold, or where the CLI resource is associated with at least the second CLI resource associated with the second level of CLI.

A non-transitory computer-readable medium storing code for wireless communication at a first UE is described. The code may include instructions executable by a processor to receive control signaling indicating a CLI reporting configuration associated with a set of CLI resources, the set of CLI resources including at least a first CLI resource and a second CLI resource, where the first CLI resource is associated with a first level of CLI and the second CLI resource is associated with a second level of CLI that is less than the first level, perform CLI measurements on signals received from a second UE within the set of CLI resources based on the CLI reporting configuration, and transmit, based on performing the CLI measurements, a CLI report identifying a CLI resource from the set of CLI resources, where the CLI resource is associated with a CLI measurement that fails to satisfy a CLI threshold, or where the CLI resource is associated with at least the second CLI resource associated with the second level of CLI.

Some examples of the method, apparatuses, and non-transitory computer-readable medium described herein may further include operations, features, means, or instructions for receiving the CLI threshold via the control signaling, where transmitting the CLI report may be based on receiving the CLI threshold.

Some examples of the method, apparatuses, and non-transitory computer-readable medium described herein may further include operations, features, means, or instructions for receiving, via the control signaling, one or more trigger conditions associated with the CLI reporting configuration and identifying a satisfaction of at least one trigger condition of the one or more trigger conditions based on performing the CLI measurements, where transmitting the CLI report may be based on identifying the satisfaction of the at least one trigger condition.

Some examples of the method, apparatuses, and non-transitory computer-readable medium described herein may further include operations, features, means, or instructions for receiving, via the control signaling, a set of multiple transmission occasions associated with the CLI reporting configuration and transmitting the CLI report within a transmission occasion of the set of multiple transmission occasions based on identifying the satisfaction of the at least one trigger condition.

Some examples of the method, apparatuses, and non-transitory computer-readable medium described herein may further include operations, features, means, or instructions for identifying a satisfaction of a trigger condition for CLI reporting based on identifying that a CLI measurement may be less than or equal to the CLI threshold, where the CLI measurement fails to satisfy the CLI threshold based on being less than or equal to the CLI threshold, where transmitting the CLI report may be based on the satisfaction of the trigger condition.

Some examples of the method, apparatuses, and non-transitory computer-readable medium described herein may further include operations, features, means, or instructions for performing additional CLI measurements on signals received from the second UE within the set of CLI resources based on the CLI reporting configuration and refraining from transmitting an additional CLI report based on at least one of the additional CLI measurements being greater than or equal to the CLI threshold, being greater than or equal to an additional CLI threshold, or both.

In some examples of the method, apparatuses, and non-transitory computer-readable medium described herein, the CLI measurements include a set of CLI measurements corresponding to respective CLI resources of the set of CLI resources and the method, apparatuses, and non-transitory computer-readable medium may include further operations, features, means, or instructions for transmitting, via the CLI report, an indication of a subset of the set of CLI resources associated with lowest CLI measurements from among the set of CLI measurements, where the subset of the set of CLI resources includes the CLI resource.

Some examples of the method, apparatuses, and non-transitory computer-readable medium described herein may further include operations, features, means, or instructions for transmitting, via the CLI report, an indication of an additional CLI resource from the set of CLI resources, where the additional CLI resource may be associated with an additional CLI measurement that satisfies the CLI threshold, or where the additional CLI resource may be associated with at least the first CLI resource associated with the first level of CLI.

In some examples of the method, apparatuses, and non-transitory computer-readable medium described herein, the CLI measurement associated with the CLI resource includes a lowest CLI measurement from among a set of multiple CLI measurements associated with the set of CLI resources.

Some examples of the method, apparatuses, and non-transitory computer-readable medium described herein may further include operations, features, means, or instructions for transmitting an indication of the CLI measurement via the CLI report.

In some examples of the method, apparatuses, and non-transitory computer-readable medium described herein, the CLI resource fails to satisfy the CLI threshold based on being less than or equal to the CLI threshold.

In some examples of the method, apparatuses, and non-transitory computer-readable medium described herein, the CLI resource spans a set of sub-bands, the CLI measurement associated with the CLI resource includes a set of measurements associated with the set of sub-bands, and the CLI measurement fails to satisfy the CLI threshold based on at least one measurement of the set of measurements failing to satisfy the CLI threshold, failing to satisfy an additional CLI threshold, or both.

Some examples of the method, apparatuses, and non-transitory computer-readable medium described herein may further include operations, features, means, or instructions for transmitting, via the CLI report, an indication of at least one sub-band from the set of sub-bands associated with the at least one measurement based on the at least one measurement failing to satisfy the CLI threshold, failing to satisfy an additional CLI threshold, or both.

In some examples of the method, apparatuses, and non-transitory computer-readable medium described herein, the CLI resource spans a set of sub-bands, the CLI measurement associated with the CLI resource includes a set of measurements associated with the set of sub-bands, and the CLI measurement fails to satisfy the CLI threshold based on an average of the set of measurements failing to satisfy the CLI threshold.

Some examples of the method, apparatuses, and non-transitory computer-readable medium described herein may further include operations, features, means, or instructions for receiving, via the control signaling, a set of transmission occasions associated with the CLI reporting configuration, where the CLI report may be transmitted within a transmission occasion of the set of transmission occasions.

In some examples of the method, apparatuses, and non-transitory computer-readable medium described herein, the CLI report may be transmitted via Layer one (L1) signaling.

In some examples of the method, apparatuses, and non-transitory computer-readable medium described herein, the signals received from the second UE include sounding reference signals (SRSs).

A method for wireless communication at a network entity is described. The method may include transmitting, to a first UE, control signaling indicating a CLI reporting configuration associated with a set of CLI resources, the set of CLI resources including at least a first CLI resource and a second CLI resource, where the first CLI resource is associated with a first level of CLI and the second CLI resource is associated with a second level of CLI that is less than the first level, receiving, from the first UE based on the CLI reporting configuration, a CLI report identifying a CLI resource from the set of CLI resources, where the CLI resource is associated with a CLI measurement that fails to satisfy a CLI threshold, or where the CLI resource is associated with at least the second CLI resource associated with the second level of CLI, and communicating with the first UE, a second UE, or both, based on the CLI report.

An apparatus for wireless communication at a network entity is described. The apparatus may include a processor, memory coupled with the processor, and instructions stored in the memory. The instructions may be executable by the processor to cause the apparatus to transmit, to a first UE, control signaling indicating a CLI reporting configuration associated with a set of CLI resources, the set of CLI resources including at least a first CLI resource and a second CLI resource, where the first CLI resource is associated with a first level of CLI and the second CLI resource is associated with a second level of CLI that is less than the first level, receive, from the first UE based on the CLI reporting configuration, a CLI report identifying a CLI resource from the set of CLI resources, where the CLI resource is associated with a CLI measurement that fails to satisfy a CLI threshold, or where the CLI resource is associated with at least the second CLI resource associated with the second level of CLI, and communicate with the first UE, a second UE, or both, based on the CLI report.

Another apparatus for wireless communication at a network entity is described. The apparatus may include means for transmitting, to a first UE, control signaling indicating a CLI reporting configuration associated with a set of CLI resources, the set of CLI resources including at least a first CLI resource and a second CLI resource, where the first CLI resource is associated with a first level of CLI and the second CLI resource is associated with a second level of CLI that is less than the first level, means for receiving, from the first UE based on the CLI reporting configuration, a CLI report identifying a CLI resource from the set of CLI resources, where the CLI resource is associated with a CLI measurement that fails to satisfy a CLI threshold, or where the CLI resource is associated with at least the second CLI resource associated with the second level of CLI, and means for communicating with the first UE, a second UE, or both, based on the CLI report.

A non-transitory computer-readable medium storing code for wireless communication at a network entity is described. The code may include instructions executable by a processor to transmit, to a first UE, control signaling indicating a CLI reporting configuration associated with a set of CLI resources, the set of CLI resources including at least a first CLI resource and a second CLI resource, where the first CLI resource is associated with a first level of CLI and the second CLI resource is associated with a second level of CLI that is less than the first level, receive, from the first UE based on the CLI reporting configuration, a CLI report identifying a CLI resource from the set of CLI resources, where the CLI resource is associated with a CLI measurement that fails to satisfy a CLI threshold, or where the CLI resource is associated with at least the second CLI resource associated with the second level of CLI, and communicate with the first UE, a second UE, or both, based on the CLI report.

Some examples of the method, apparatuses, and non-transitory computer-readable medium described herein may further include operations, features, means, or instructions for transmitting the CLI threshold via the control signaling, where receiving the CLI report may be based on transmitting the CLI threshold.

Some examples of the method, apparatuses, and non-transitory computer-readable medium described herein may further include operations, features, means, or instructions for transmitting, via the control signaling, one or more trigger conditions associated with the CLI reporting configuration, where receiving the CLI report may be based on a satisfaction of at least one trigger condition of the one or more trigger conditions.

Some examples of the method, apparatuses, and non-transitory computer-readable medium described herein may further include operations, features, means, or instructions for transmitting, via the control signaling, a set of multiple transmission occasions associated with the CLI reporting configuration and receiving the CLI report within a transmission occasion of the set of multiple transmission occasions based on the satisfaction of the at least one trigger condition.

Some examples of the method, apparatuses, and non-transitory computer-readable medium described herein may further include operations, features, means, or instructions for receiving the CLI report based on a satisfaction of a trigger condition for CLI reporting, where the satisfaction of the trigger condition may be based on the CLI measurement being less than or equal to the CLI threshold, where the CLI measurement fails to satisfy the CLI threshold based on being less than or equal to the CLI threshold.

In some examples of the method, apparatuses, and non-transitory computer-readable medium described herein, the CLI measurement may be included within a set of CLI measurements corresponding to respective CLI resources of the set of CLI resources and the method, apparatuses, and non-transitory computer-readable medium may include further operations, features, means, or instructions for receiving, via the CLI report, an indication of a subset of the set of CLI resources associated with lowest CLI measurements from among the set of CLI measurements, where the subset of CLI resources includes the CLI resource.

Some examples of the method, apparatuses, and non-transitory computer-readable medium described herein may further include operations, features, means, or instructions for receiving, via the CLI report, an indication of an additional CLI resource from the set of CLI resources, where the additional CLI resource may be associated with an additional CLI measurement that satisfies the CLI threshold, or where the additional CLI resource may be associated with at least the first CLI resource associated with the first level of CLI.

In some examples of the method, apparatuses, and non-transitory computer-readable medium described herein, the CLI measurement associated with the CLI resource includes a lowest CLI measurement from among a set of multiple CLI measurements associated with the set of CLI resources.

Some examples of the method, apparatuses, and non-transitory computer-readable medium described herein may further include operations, features, means, or instructions for receiving an indication of the CLI measurement via the CLI report.

In some examples of the method, apparatuses, and non-transitory computer-readable medium described herein, the CLI resource fails to satisfy the CLI threshold based on being less than or equal to the CLI threshold.

In some examples of the method, apparatuses, and non-transitory computer-readable medium described herein, the CLI resource spans a set of sub-bands, the CLI measurement associated with the CLI resource includes a set of measurements associated with the set of sub-bands, and the CLI measurement fails to satisfy the CLI threshold based on at least one measurement of the set of measurements failing to satisfy the CLI threshold, failing to satisfy an additional CLI threshold, or both.

Some examples of the method, apparatuses, and non-transitory computer-readable medium described herein may further include operations, features, means, or instructions for receiving, via the CLI report, an indication of at least one sub-band from the set of sub-bands associated with the at least one measurement based on the at least one measurement failing to satisfy the CLI threshold, failing to satisfy an additional CLI threshold, or both.

In some examples of the method, apparatuses, and non-transitory computer-readable medium described herein, the CLI resource spans a set of sub-bands, the CLI measurement associated with the CLI resource includes a set of measurements associated with the set of sub-bands, and the CLI measurement fails to satisfy the CLI threshold based on an average of the set of measurements failing to satisfy the CLI threshold.

Some examples of the method, apparatuses, and non-transitory computer-readable medium described herein may further include operations, features, means, or instructions for transmitting, via the control signaling, a set of transmission occasions associated with the CLI reporting configuration, where the CLI report may be received within a transmission occasion of the set of transmission occasions.

In some examples of the method, apparatuses, and non-transitory computer-readable medium described herein, the CLI report may be received via L1 signaling.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

DETAILED DESCRIPTION

Figure 1:
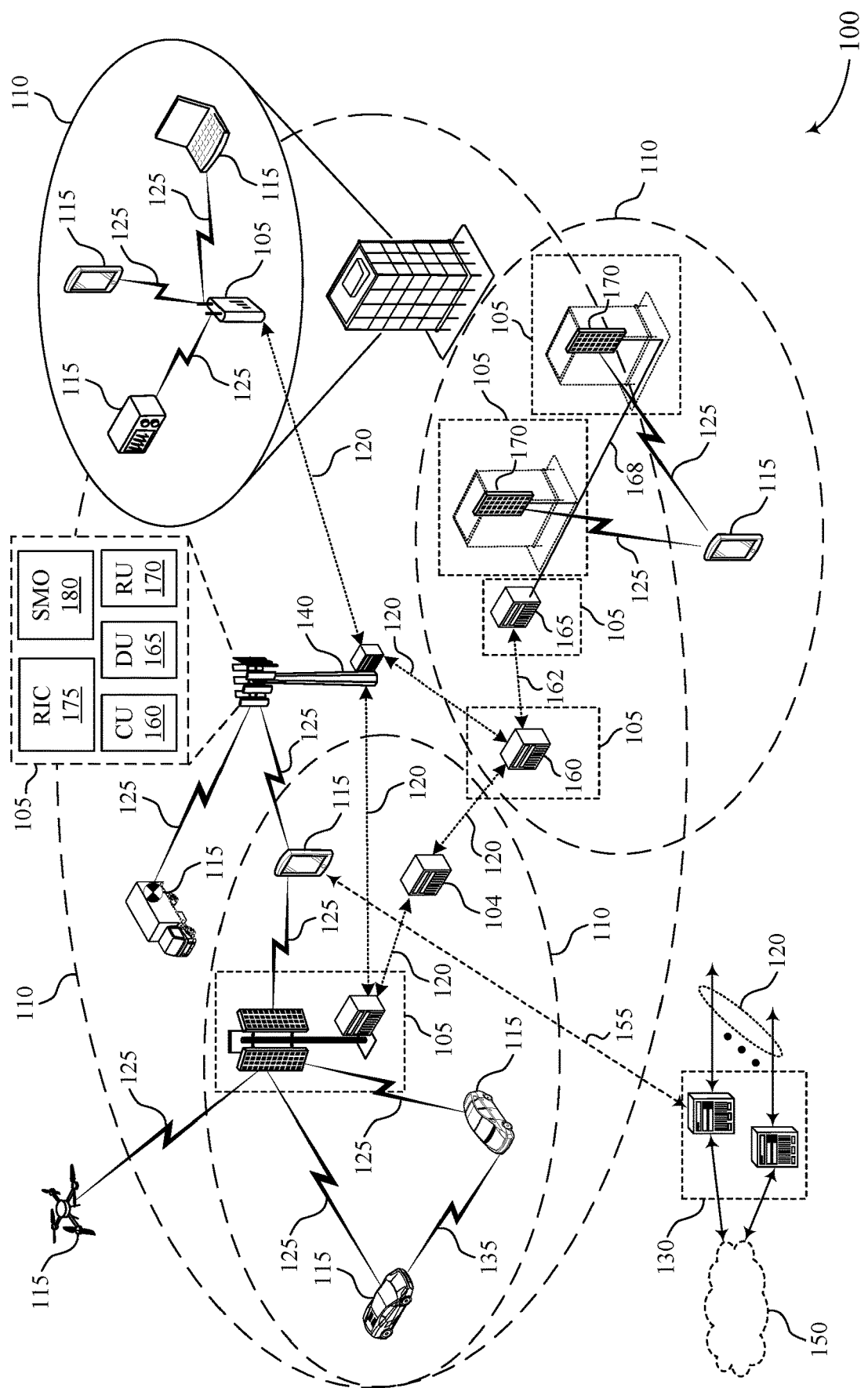
FIG. 1 illustrates an example of a wireless communications system that supports techniques for cross-link interference (CLI) reporting trigger conditions in accordance with one or more aspects of the present disclosure.

In some wireless communications systems, user equipments (UE) may perform cross-link interference (CLI) measurements on interfering signals received from other UEs. For example, a "victim" UE may experience CLI from signals transmitted by an "aggressor" UE in cases where uplink communications transmitted by the aggressor UE collide with downlink communications received by the victim UE. The network may utilize CLI reports from victim UEs to mitigate CLI throughout the network, such as by adjusting scheduling across UEs, reducing transmit powers of aggressor UEs, and the like. However, some conventional CLI reporting techniques only enable victim UEs to indicate resources that exhibit high CLI measurements (e.g., only enable reporting the most-interfering CLI resources). This information may enable the network to determine resources and beams that exhibit poor performance at the victim UEs, but do not provide information associated with preferred resources/beams that may exhibit superior performance at the victim UEs. In other words, some conventional CLI reporting techniques provide the network information which enable the network to avoid scheduling communications on resources that exhibit poor performance (e.g., high CLI), but do not provide the network with information that enable the network to schedule communications on resources that exhibit sufficient performance (e.g., low CLI).

Accordingly, aspects of the present disclosure are directed to signaling and techniques which enable victim UEs to report least-interfering CLI resources to the network. For the purposes of the present disclosure, the term "least-interfering CLI resources" may be used to refer to resources that exhibit relatively low CLI compared to other resources, including CLI resources that exhibit CLI below some threshold. As such, the term "least-interfering CLI resources" may not always refer to CLI resources that exhibit the absolute lowest CLI, but may rather refer to any CLI resources that exhibit a lower level of CLI relative to other CLI resources, and/or CLI resources that exhibit a sufficiently low level of CLI (e.g., CLI that is less than some threshold).

In other words, aspects of the present disclosure are directed to CLI reporting techniques that enable victim UEs to report CLI resources with the least CLI (e.g., X least-interfering CLI resources), CLI resources that exhibit CLI below some threshold, or both. For example, a victim UE may receive (e.g., obtain) a CLI reporting configuration for reporting CLI resources below some threshold, reporting a quantity of least-interfering CLI resources, or both. The victim UE may then perform CLI measurements on signals received from other UEs (e.g., aggressor UEs), and transmit a CLI report indicating a quantity of least-interfering CLI resources, CLI resources that exhibit low CLI (e.g., CLI below a threshold), or both.

In some aspects, certain conditions may trigger victim UEs to report least-interfering CLI resources. Trigger conditions for reporting least-interfering CLI resources may be configured at UEs, signaled by the network, or both. In some cases, a trigger condition for CLI reporting may be satisfied if any CLI resource exhibits CLI less than some threshold CLI. Victim UEs may report actual CLI measurements for the least-interfering CLI resources, or only report CLI identifiers associated with the least-interfering CLI resources. Trigger conditions for reporting a least-interfering CLI resource may be based on an average CLI measurement across the CLI resource (wideband reporting), or based on a CLI measurement of at least one sub-band within the CLI resource (sub-band reporting).

Aspects of the disclosure are initially described in the context of wireless communications systems. Additional aspects of the disclosure are described in the context of an example resource configuration and an example process flow. Aspects of the disclosure are further illustrated by and described with reference to apparatus diagrams, system diagrams, and flowcharts that relate to techniques for CLI reporting trigger conditions.

FIG. 1 illustrates an example of a wireless communications system 100 that supports techniques for CLI reporting trigger conditions in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes 104 may communicate over an F1 interface according to a protocol that defines signaling messages (e.g., an F1 AP protocol). Additionally, or alternatively, the CU 160 may communicate with the core network over an interface, which may be an example of a portion of backhaul link, and may communicate with other CUs 160 (e.g., a CU 160 associated with an alternative IAB donor) over an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support techniques for CLI reporting trigger conditions as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/$ ($\Delta f_{max} \cdot N_f$) seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may obtain or receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multipanel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

In some aspects, the UEs 115 and the network entities 105 (e.g., base stations) of the wireless communications system 100 may support signaling and techniques which enable victim UEs to report least-interfering CLI resources to the network. In other words, aspects of the present disclosure are directed to CLI reporting techniques that enable victim UEs to report CLI resources with the least CLI (e.g., X least-interfering CLI resources), CLI resources that exhibit CLI below some threshold, or both. As such, aspects of the present disclosure may enable UEs 115 to report CLI resources which exhibit relatively low CLI (as opposed to reporting the most-interfering CLI resources), thereby providing the network with a more complete and comprehensive picture regarding CLI experienced at the respective UEs 115. In particular, by enabling UEs 115 to report least-interfering CLI resources, techniques described herein may enable the network to schedule wireless communications at the UEs 115 within resources that that are likely to exhibit a low probability or severity of CLI.

For example, a victim UE 115 of the wireless communications system 100 may receive (e.g., obtain), from a network entity 105, a CLI reporting configuration for reporting CLI resources below some threshold, reporting a quantity of least-interfering CLI resources, or both. In other words, the victim UE 115 may receive a CLI reporting configuration for reporting least-interfering CLI resources. Such CLI reporting configurations for reporting least-interfering CLI resources may be configured at UEs 115 in addition to, or in the alternate to, CLI reporting configurations for reporting most-interfering CLI resources. In this example, the victim UE 115 may perform CLI measurements on signals received from other UEs 115 (e.g., aggressor UEs 115) in accordance with the CLI reporting configuration, and may transmit (e.g., output) a CLI report indicating a quantity of least-interfering CLI resources, CLI resources that exhibit low CLI (e.g., CLI below a threshold), or both.1

In some aspects, certain conditions may trigger victim UEs 115 to report least-interfering CLI resources (e.g., CLI resources that exhibit. Trigger conditions for reporting least-interfering CLI resources may be configured at UEs 115, signaled by the network, or both. In some cases, a trigger condition for CLI reporting may be satisfied if any CLI resource exhibits CLI less than some threshold CLI. Victim UEs 115 may report actual CLI measurements for the least-interfering CLI resources, or only report CLI identifiers associated with the least-interfering CLI resources. Trigger conditions for reporting a least-interfering CLI resource may be based on an average CLI measurement across the CLI resource (wideband reporting), or based on a CLI measurement of at least one sub-band within the CLI resource (sub-band reporting).

Techniques described herein may enable victim UEs 115 to report CLI resources that exhibit a sufficiently low level of CLI (e.g., CLI below a threshold), a quantity of least-interfering CLI resources, or both. Techniques for least-interfering CLI reporting may be enabled in addition to, or in the alternate to, other CLI reporting techniques for reporting most-interfering CLI resources. Accordingly, techniques described herein may improve a granularity at which CLI may be reported to the network, thereby providing the network with a more complete and comprehensive picture regarding CLI experienced at the respective UEs 115. Moreover, by enabling UEs 115 to report least-interfering CLI resources, techniques described herein may enable the network to schedule wireless communications at UEs 115 via resources that exhibit sufficiently low levels of CLI performance (e.g., resources that exhibit CLI below some threshold), which may thereby improve an efficiency and reliability of wireless communications performed within the wireless communications system 100.

Figure 2:
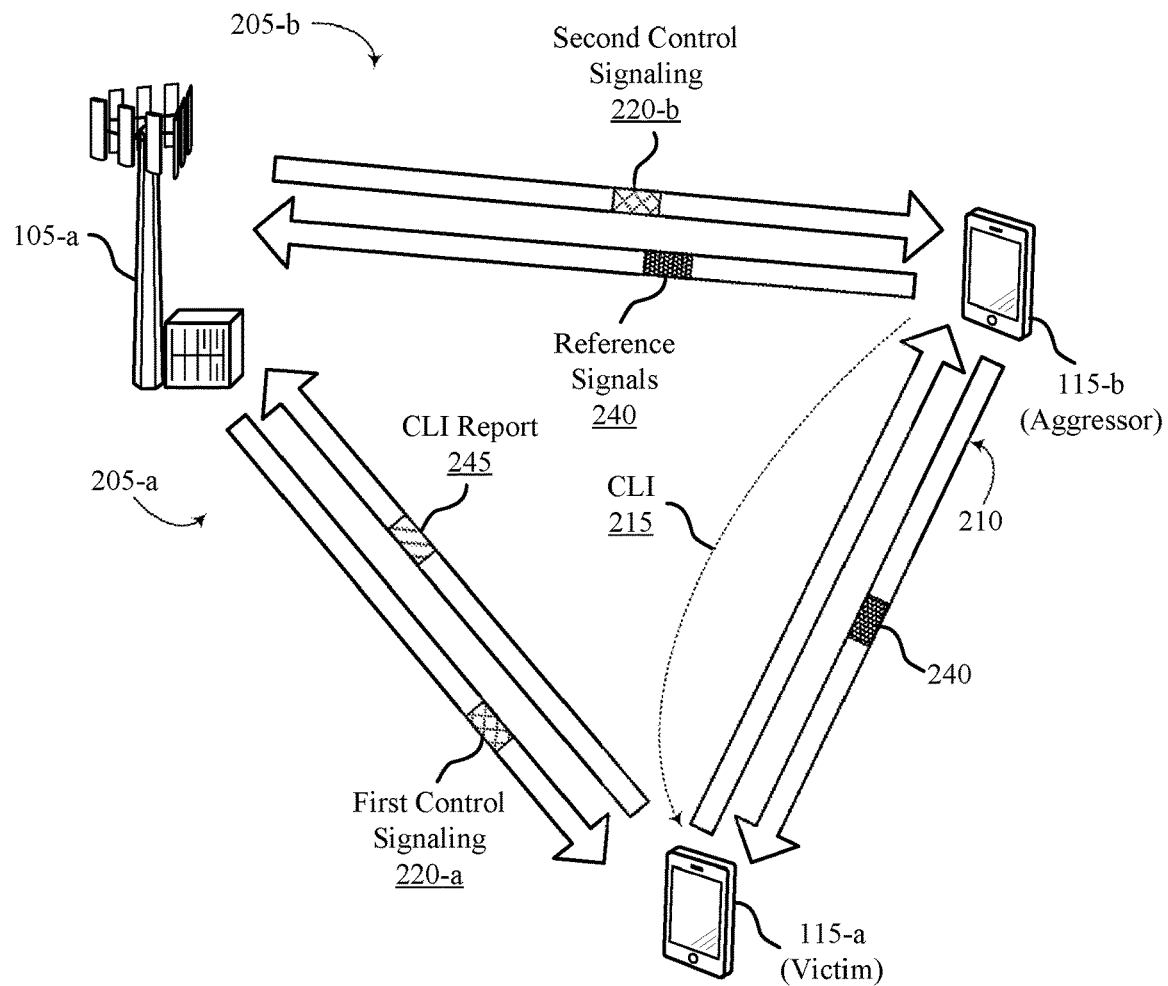
FIG. 2 illustrates an example of a wireless communications system that supports techniques for CLI reporting trigger conditions in accordance with one or more aspects of the present disclosure.
Figure 2:
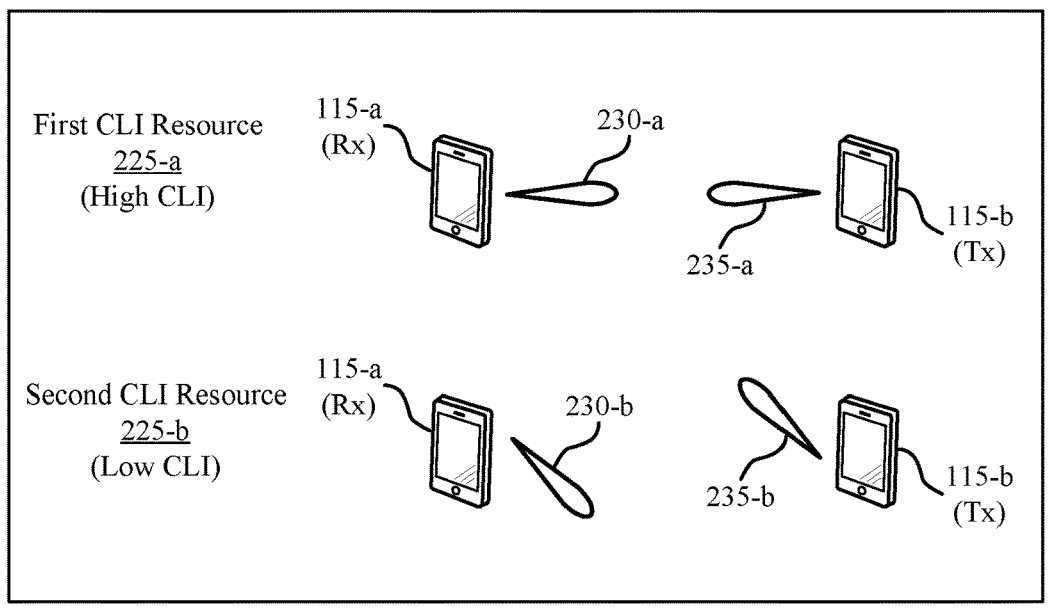

FIG. 2 illustrates an example of a wireless communications system 200 that supports techniques for CLI reporting trigger conditions in accordance with one or more aspects of the present disclosure. In some examples, aspects of the wireless communications system 200 may implement, or be implemented by, aspects of the wireless communications system 100. In particular, the wireless communications system 200 may support CLI reporting configurations for reporting least-interfering CLI resources, as described herein.

The wireless communications system 200 may include a network entity 105-a, a first UE 115-a (e.g., victim UE 115-a), and a second UE 115-b (e.g., aggressor UE 115-b), which may be examples of network entities 105 and UEs 115 as described with reference to FIG. 1. The first UE 115-a and the second UE 115-b may communicate with the network entity 105-a using communication links 205-a and 205-b, respectively, which may be examples of NR or LTE links between the UEs 115-a, 115-b and the network entity 105-a. In some cases, the communication links 205-a, 205-b between the UEs 115-a, 115-b and the network entity 105-a may include examples of access links (e.g., Uu links) which may include bi-directional links that enable both uplink and downlink communication. For example, the first UE 115-a may transmit (e.g., output) uplink signals, such as uplink control signals or uplink data signals, to one or more components of the network entity 105-a using the communication link 205-a, and one or more components of the network entity 105-a may transmit (e.g., output) downlink signals, such as downlink control signals or downlink data signals, to the first UE 115-a using the communication link 205-a. Similarly, the first UE 115-a and the second UE 115-b may communicate with one another via a communication link 210, which may be an example of a sidelink communication link or a PC5 link.

As noted previously herein, UEs 115 may be configured to measure CLI attributable to signals received from other UEs 115. For example, as shown in FIG. 2 and in the context of a dynamic TDD communications mode, the first UE 115-a (e.g., "victim" UE 115-a) may experience CLI 215 attributable to signals transmitted by the second UE 115-b (e.g., "aggressor" UE 115-b) in cases where uplink communications transmitted by the second UE 115-b collide with downlink communications received by the first UE 115-a. In other words, the first UE 115-a may experience CLI 215 when the network entity 105-a transmits downlink signals which overlap with (e.g., at the same time as) uplink signals transmitted by the second UE 115-b. The first UE 115-a may experience CLI 215 even in cases where the uplink communications transmitted by the second UE 115-b are not intended for the first UE 115-a, but are nonetheless received or intercepted by the first UE 115-a.

In some implementations, the first UE 115-a may be configured to measure the CLI 215 experienced at the first UE 115-a, and transmit a CLI report 245 to the network entity 105-a. The network entity 105-a may utilize CLI reports received/obtained from the first UE 115-a to mitigate CLI 215 experienced by the first UE 115-a, such as by adjusting scheduling across the UEs 115-a, 115-b, reducing transmit powers of the second UE 115-b, and the like. In other words, the network entity 105-a may make scheduling decisions based on CLI reports received from the first UE 115-a. For example, in cases where the first UE 115-a experiences strong CLI 215 attributable to signals transmitted by the second UE 115-b, the network entity 105-a may consider scheduling the first UE 115-a and the second UE 115-b in different time/frequency resources to avoid the strong CLI 215.

Moreover, some wireless communications systems enable network entities and other devices to perform both half-duplex and full-duplex communications. In the context of a half-duplex operational mode, a wireless device (e.g., network entity 105-a, UEs 115) may be configured to transmit or receive in only one direction at a time. Comparatively, in the context of a full-duplex operational mode, a wireless devices may be able to simultaneously perform downlink and uplink communications. For example, the network entity 105-a of the wireless communications system 200 may support a full-duplex operational mode in which the network entity 105-a is able to simultaneously transmit downlink communications and receive uplink communications. Such full-duplex capabilities at network entities 105 may increase the prevalence of CLI 215 experienced by UEs 115 within the wireless communications systems 200 due to the simultaneous performance of downlink and uplink communications.

When performing CLI measurements, the second UE 115-b may transmit reference signals 240 (e.g., sounding reference signals (SRSs)) which at least partially overlap in the time domain with downlink communications scheduled at the first UE 115-a. As such, some reference signals 240 may be received, or otherwise intercepted, by the first UE 115-a, and the first UE 115-a may measure a resulting interference strength (e.g., strength of CLI 215) of the received reference signals 240 on the scheduled downlink communications. The first UE 115-a may report CLI measurements to the network entity 105-a via a CLI report 245, where the CLI measurements may be indicated via reference signal received power (RSRP) measurements (e.g., SRS-RSRP), received signal strength indicator (RSSI) measurements (e.g., CLI-RSSI), or both. In some aspects, the first UE 115-a may report CLI measurements (e.g., transmit CLI reports) periodically, or based on certain triggering conditions (e.g., when measured CLI 215 is above some threshold).

Some CLI reporting techniques enable CLI reports 245 to be transmitted via Layer 3 (L3) signaling (e.g., not Layer 1 (L1) measurements). In such cases, CLI reports 245 received (e.g., obtained) by the network entity 105-a may be collected by a gNB-CU, then reported to the gNB-DU. Such L1 signaling may increase a latency of CLI reporting, which may increase a time for CLI mitigation at the first UE 115-a. Moreover, increased L1 latency may cause filtered results which are not suitable for fast beam selection (e.g., fast L1 beam selection) in response to interference variation (e.g., CLI variation). Further, configuration updates via L3 signaling may require RRC reconfiguration, which inefficient, not overly flexible, and which further increases a latency of CLI reporting. Accordingly, as will be described in further detail herein, some aspects of the present disclosure enable CLI reports 245 to be transmitted via L1 signaling (e.g., via MAC-CE, uplink control information (UCI)). As compared to L3 signaling, in which CLI reports 245 are collected by the gNB-CU and reported to the gNB-DU, CLI reports transmitted via L1 signaling may be collected directly by the gNB-DU, thereby reducing a latency of CLI reporting relative to conventional CLI reporting techniques which rely on L3 signaling. As such, techniques described herein may provide for more dynamic CLI reporting with reduced latency, which may enable fast beam selection in response to reported CLI 215.

As noted previously herein, some CLI reporting techniques only enable victim UEs 115 to indicate resources that exhibit high CLI measurements (e.g., maxReportCLI, reporting the most-interfering CLI resources). As it is used herein, the term "most-interfering CLI resources" may be used to refer to CLI resources that exhibit a higher level of CLI relative to other CLI resources, CLI resources that exhibit CLI above some threshold, or both. This information may enable the network to determine resources and beams that exhibit poor performance at the victim UEs 115, but do not provide information associated with preferred resources/beams that may exhibit superior performance at the victim UEs 115.

In accordance with some CLI reporting configurations, most-interfering CLI resources may be reported in either periodic or event-triggered CLI reports, and may primarily rely on L3 signaling. In some cases, CLI reports for most-interfering CLI resources transmitted via L3 signaling may be triggered when certain conditions (e.g., trigger conditions) are met or satisfied. Trigger conditions for reporting most-interfering CLI resources may be satisfied when CLI measurements (e.g., RSSI, RSRP of CLI) of any CLI resource in a set of CLI resources (e.g., within a CLI resource list) is greater than or equal to a CLI threshold. In other words, some CLI reporting configurations may trigger a CLI report for most-interfering CLI resources if a measured CLI metric (adjusted by some hysteresis or adjustment factor) is greater than some CLI threshold (e.g., trigger CLI reporting if Measured CLI metric−Hysterisis>Threshold). Conversely, in accordance with some CLI reporting configurations, a UE 115 may stop reporting most-interfering CLI resources when a CLI measurement of any CLI resource in a set of CLI resources (e.g., within a CLI resource list) is less than or equal to some CLI threshold. In other words, some CLI reporting configurations may cause UEs 115 to stop transmitting CLI reports for most-interfering CLI resources if a measured CLI metric (adjusted by some hysteresis or adjustment factor) is less than some CLI threshold (e.g., stop CLI reporting if Measured CLI metric+Hysterisis>Threshold).

As such, in accordance with some CLI reporting configurations, victim UEs 115 may be configured to transmit CLI reports only in cases when measured CLI is larger than some threshold. In this regard, some conventional CLI reports for most-interfering CLI resources enable the network to determine resources that exhibit poor performance at the victim UEs 115, but do not provide information associated with preferred resources/beams that may exhibit superior performance at the victim UEs 115. In other words, some conventional CLI reporting techniques provide the network information which enable the network to avoid scheduling communications on resources that exhibit poor performance (e.g., high CLI), but do not provide the network with information that enable the network to schedule communications on resources that exhibit sufficient performance (e.g., low CLI).

Accordingly, the wireless communications system 200 may be configured to support signaling and techniques which enable victim UEs 115 (e.g., first UE 115-a) to report least-interfering CLI resources to the network entity 105-a.

In particular, aspects of the present disclosure may enable the first UE 115-*a* (e.g., victim UE 115-*a*) to transmit CLI reports 245 which indicate CLI resources that exhibit a level of CLI below some threshold, CLI resources that exhibit lower CLI compared to other CLI resources, or both. In this regard, aspects of the present disclosure may support CLI reporting configurations which provide the network entity 105-*a* with a more complete and comprehensive picture regarding CLI 215 experienced at the first UE 115-*a*, which may further improve an ability of the network entity 105-*a* to schedule wireless communications at the first UE 115-*a* (e.g., schedule communications at the first UE 115-*a* using resources that exhibit sufficiently low CLI 215).

For example, as shown in FIG. 2, the network entity 105-*a* may transmit (e.g., output) first control signaling 220-*a* to the first UE 115-*a*. Similarly, the network entity 105-*a* may transmit or output second control signaling 220-*b* to the second UE 115-*b*. In some aspects, the first control signaling 220-*a*, the second control signaling 220-*b*, or both, may include or indicate a CLI reporting configuration associated with a set of CLI resources 225. The first control signaling 220-*a* and/or second control signaling 220-*b* may indicate parameters, resources, and/or characteristics for reporting least-interfering CLI resources 225 in accordance with the CLI reporting configuration. In this regard, the CLI reporting configuration may be configured to cause the first UE 115-*a* to report CLI resources 225 which exhibit a lower level of CLI compared to other CLI resources 225, CLI resources 225 that exhibit a level of CLI below some threshold, or both. The first control signaling 220-*a*, the second control signaling 220-*b*, or both, may include RRC signaling, DCI signaling, MAC-CE signaling, or any combination thereof.

In some aspects, the first control signaling 230-*a* and/or second control signaling 220-*b* may indicate parameters and characteristics associated with each respective CLI resource 225, including time resources, frequency resources, spatial resources, Rx beams 230, Tx beams 235, and the like. For example, the first control signaling 220-*a*, the second control signaling 220-*b*, or both, may indicate a CLI reporting configuration including a set of CLI resources 225 including a first CLI resource 225-*a* and a second CLI resource 225-*b*. The CLI resources 225 may include time, frequency, and spatial resources which are to be measured for CLI 215. Additionally, or alternatively, each CLI resource 225 may be associated with beams at the first UE 115-*a* (e.g., Rx beams) and/or the second UE 115-*b* (e.g., Tx beams), where the beams are to be used to transmit/receive signals for CLI measurement within the respective CLI resources 225.

For instance, as shown in FIG. 2, the first CLI resource 225-*a* may be associated with a first Rx beam 230-*a* at the first UE 115-*a*, and a first Tx beam 235-*a* at the second UE 115-*b*. In this example, when performing CLI measurement for the first CLI resource 225-*a*, the second UE 115-*b* may transmit reference signals 240 (within a defined set of time/frequency/spatial resources) using the first Tx beam 235-*a*, and the first UE 115-*a* may receive the reference signals 240 for CLI measurement using the first Rx beam 230-*a*. Similarly, the second CLI resource 225-*b* may be associated with a second Rx beam 230-*b* at the first UE 115-*a*, and a second Tx beam 235-*b* at the second UE 115-*b*, such that the UEs 115-*a*, 115-*b* are configured to utilize the respective beams 230-*b*, 230-*b* to transmit/receive reference signals 240 for measuring CLI associated with the second CLI resource 225-*b*.

In some aspects, the first control signaling 220-*a* may indicate various parameters associated with the CLI reporting configuration for least-interfering CLI resources 225, including trigger conditions for CLI reporting, thresholds, time/frequency/spatial resources associated with the CLI resources 225, resources or transmission occasions for transmitting CLI reports 245, and the like.

For example, in some implementations, the first control signaling 220-*a* may indicate one or more trigger conditions used for triggering (e.g., activating) CLI reporting by the first UE 115-*a*. Trigger conditions for CLI reporting may be satisfied based on any number of parameters or characteristics associated with the first UE 115-*a*, the network, and the like. For instance, in some cases, the first control signaling 220-*a* may indicate a CLI threshold associated with a trigger condition for CLI reporting. In this example, the trigger condition may be satisfied if CLI measurements performed by the first UE 115-*a* satisfy (e.g., are greater than or equal to) the indicated CLI threshold.

By way of another example, in some implementations, the first control signaling 220-*a* may indicate a set of resources (e.g., transmission occasions) usable by the first UE 115-*a* to transmit CLI reports 245. In some cases, the resources/transmission occasions for CLI reports 245 may originally be configured in an inactive state, where the resources/transmission occasions are transitioned to an active state (e.g., are activated, or otherwise usable) upon a satisfaction of a trigger condition for CLI reporting.

The second UE 115-*b* may transmit or output signals (e.g., reference signals 240) to the network entity 105-*a*, the first UE 115-*a*, or both. For example, the second UE 115-*b* may transmit reference signals 240 to the network entity 105-*a*, where at least a portion of the reference signals 240 are received or otherwise intercepted by the first UE 115-*a*. As such, in some cases, signals transmitted by the second UE 115-*b* at 415 may be intended for the network entity 105-*a*, but may nevertheless be received or intercepted by the first UE 115-*a*. The reference signals 240 may include any reference signal, including SRSs.

In some aspects, the second UE 115-*b* may transmit the reference signals 240 based on receiving the second control signaling 220-*b* (e.g., in accordance with the CLI reporting configuration indicated via the second control signaling 220-*b*). Similarly, the first UE 115-*a* may receive the reference signals 240 based on receiving the first control signaling 220-*a* (e.g., in accordance with the CLI reporting configuration indicated via the first control signaling 220-*a*). In particular, the first UE 115-*a* and the second UE 115-*b* may receive and transmit the reference signals 240 based on (e.g., within, using) the CLI resources 225 indicated via the first control signaling 220-*a* and the second control signaling 220-*b*, respectively. Moreover, the first UE 115-*a* and the second UE 115-*b* may receive and transmit the reference signals 240 based on (e.g., within, using) the Rx beams 230 and Tx beams 235 indicated via the respective control signaling 220. For example, in order to perform CLI measurement for the first CLI resource, the second UE 115-*b* may transmit reference signals 240 using the first Tx beam 235-*a*, and the first UE 115-*a* may receive the reference signals 240 using the first Rx beam 230-*a*.

Subsequently, the first UE 115-*a* may perform CLI measurements attributable to signals (e.g., reference signals 240) received from the second UE 115-*b*. In particular, the first UE 115-*a* may perform the CLI measurements on reference signals 240 received from the second UE 115-*b* within the set of CLI resources 225 indicated via the first control signaling 220-*a* and in accordance with the CLI reporting configuration. In this regard, the first UE 115-*a* may perform CLI measurements based on receiving the first control signaling 220-*a*, and receiving/intercepting the reference signals 240. The CLI measurements may include RSSI measurements (e.g., CLI-RSSI), RSRP measurements (e.g., SRS-RSRP), RSRQ measurements, or any combination thereof.

In some aspects, the first UE 115-*a* may perform CLI measurements associated with each of (or at least a subset of) the set of CLI resources 225 associated with the CLI reporting configuration. For example, in cases where the CLI reporting configuration includes the first CLI resource 225-*a* and the second CLI resource 225-*b*, the first UE 115-*a* may perform a first CLI measurement on a first reference signal 240 received within the first CLI resource 225-*a*, and a second CLI measurement on a second reference signal 240 received within the second CLI resource 225-*b*. As shown in FIG. 2, in some examples, the first CLI resource 225-*a* may exhibit a relatively high CLI 215, where the second CLI resource 225-*b* may exhibit a relatively low CLI 215.

In some aspects, the first UE 115-*a* may identify that one or more trigger conditions for CLI reporting have been satisfied. In particular, the first UE 115-*a* may identify the satisfaction of one or more trigger conditions associated with the CLI reporting configuration based on receiving the first control signaling 220-*a*, receiving the reference signals 240, performing the CLI measurements, or any combination thereof. For example, the first UE 115-*a* may identify a satisfaction of a trigger condition included within a set of trigger conditions indicated via the first control signaling 220-*a*.

In some cases, the first UE 115-*a* may evaluate whether trigger conditions have been satisfied or not by comparing CLI measurements to one or more thresholds. For example, in some cases, a trigger condition for CLI reporting may be satisfied if a CLI measurement for at least one CLI resource 225 is less than or equal to a CLI threshold (e.g., trigger condition satisfied if $CLI_{ResourceN} \leq CLI_{Thresh}$). For instance, a trigger condition for CLI reporting may be satisfied if a CLI measurement associated with the second CLI resource 225-*b* is less than or equal to a CLI threshold.

By way of another example, a trigger condition for CLI reporting may be satisfied if an average or median CLI measurement across the set of CLI resource 225 is less than or equal to a CLI threshold (e.g., trigger condition satisfied if $CLI_{Avg} \leq CLI_{Thresh}$). For instance, a trigger condition for CLI reporting may be satisfied if an average CLI measurement across the first CLI resource 225-*a* and the second CLI resource 225-*b* is less than or equal to a CLI threshold.

In some cases, the first UE 115-*a* may be configured to measure CLI (and evaluate a satisfaction of trigger conditions) with different granularities. In particular, each CLI resource 225 may be associated with a frequency range which includes (e.g., spans) multiple sub-bands. In such cases, the first UE 115-*a* may be configured to evaluate a satisfaction of trigger conditions for CLI reporting based on average/median CLI measurements across CLI resources 225 (wideband reporting), based on CLI measurements for individual sub-bands within a CLI resource 225 (sub-band reporting), or both. Evaluation of trigger conditions with respect to CLI resources 225 and sub-bands within CLI resources will be shown and described in further detail with respect to FIG. 3.

In some aspects, the first UE 115-*a* may transmit or output, to the network entity 105-*a*, a CLI report 245 associated with CLI experienced at the first UE 115-*a*. In other words, the first UE 115-*a* may transmit a CLI report 245 indicating the CLI measurements performed for the CLI resources 225. Moreover, the first UE 115-*a* may transmit the CLI report 245 in accordance with the CLI reporting condition, and based on a satisfaction of one or more trigger conditions for CLI reporting. For example, in some cases, the CLI reporting configuration may cause the first UE 115-*a* to report CLI resources 225 associated with the lowest RSSI measurements (e.g., minSRS-RSSI).

In this regard, the first UE 115-*a* may transmit (e.g., output) the CLI report 245 based on receiving the first control signaling 220-*a* (e.g., CLI reporting configuration), receiving the reference signals 240, performing the CLI measurements, identifying the satisfaction of one or more trigger conditions, or any combination thereof. For example, the first UE 115-*a* may transmit the CLI report 245 within a resource (e.g., transmission occasion) associated with the CLI reporting configuration which was indicated via the first control signaling 220-*a*.

In some implementations, the first UE 115-*a* may transmit the CLI report 245 via L1 signaling, L3 signaling, or both. In this regard, in some aspects, the CLI report 245 may be transmitted via a UCI message, a MAC-CE message, or both. As described previously herein, in some cases, the use of L1 signaling for communicating CLI reports 245 may reduce a latency of CLI reporting, which may thereby result in faster and more efficient CLI mitigation at the first UE 115-*a*.

In some aspects, the CLI report 245 may indicate least-interfering CLI resources 225 at the first UE 115-*a*. For example, in cases where the CLI reporting configuration includes the first CLI resource 225-*a* and the second CLI resource 225-*b*, the CLI report 245 may indicate the second CLI resource 225-*b* based on the second CLI resource 225-*b* satisfying a trigger condition and/or exhibiting a lower level of CLI as compared to the first CLI resource 225-*a*.

For example, in some cases, the CLI report 245 may indicate a first subset of CLI resources 225 which exhibit a lower level of CLI compared to a second subset of CLI resources 225 (e.g., lesser-interfering CLI resources 225). For instance, the CLI reporting configuration may include ten CLI resources 225, and may cause the first UE 115-*a* to report the three CLI resources 225 that are associated with the lowest CLI measurements. In this regard, the CLI reporting configuration may cause the first UE 115-*a* to report a subset of the set of CLI resources 225 that are associated with the lowest CLI measurements.

Additionally, or alternatively, the CLI report 245 may indicate one or more CLI resources 225 associated with CLI measurements that satisfy a CLI threshold (e.g., CLI resources 225 associated with CLI measurements that are less than or equal to the CLI threshold). For example, in cases where the CLI reporting configuration includes ten CLI resources 225, and five of the CLI resources 225 exhibit CLI measurements that satisfy (e.g., are less than or equal to) a CLI threshold, the CLI report 245 may indicate the five respective CLI resources 225 which satisfy the CLI threshold.

In some aspects, the CLI report 245 may include indicators associated with the respective CLI resources 225 (e.g., CLI indexes, CLI IDs), the CLI measurements, or both. For example, in some cases, the CLI report 245 may simply indicate which CLI resources 225 exhibit the lowest CLI (or CLI below some threshold), but may not actually indicate the CLI measurements for the reported CLI resources 225. In other cases, the CLI report 245 may indicate both the least-interfering CLI resources 225 as well as the CLI measurements associated with the least-interfering CLI resources 225. CLI resources 225 and/or CLI measurements may be indicated via the CLI report 245 via a table or other data object. Moreover, the CLI report 245 may order, rank, or otherwise indicate a relative quality of CLI resources 225 (e.g., rank the CLI resources 225 from lowest to highest CLI, or vice versa).

As will be described in further detail with respect to FIG. 3, the first UE 115-a may be configured to perform wideband reporting, sub-band reporting, or both. In this regard, the CLI report 245 may indicate full CLI resources 225 which satisfy the trigger condition, specific sub-bands which satisfy the trigger condition, or both. For example, in the context of wideband reporting, a trigger condition for CLI reports 245 may be satisfied if a CLI measurement for any individual sub-band(s) satisfies a trigger condition, if an average/median CLI measurement across the sub-bands of the CLI resource 225 satisfies the trigger condition, or both. In such cases, the CLI report 245 may indicate the respective CLI resource 225 which satisfies the trigger condition. Comparatively, in the context of sub-band reporting, a trigger condition for CLI reports 245 may be satisfied if a CLI measurement for any individual sub-band(s) satisfies a trigger condition, in which case the CLI report 245 may indicate the individual sub-band(s) which satisfy the trigger condition. Wideband and sub-band reporting will be discussed in further detail with respect to FIG. 3.

In some cases, the first UE 115-a may report most-interfering CLI resources 225 in addition to reporting least-interfering CLI resources 225. For example, in some implementations, the CLI report 245 may include a first subset of least-interfering CLI resources 225 (e.g., X number of CLI resources 225 that exhibit the lowest level of CLI, or CLI resources 225 with CLI below a first CLI threshold), as well as a second subset of most-interfering CLI resources 225 (e.g., Y number of CLI resources 225 that exhibit the highest level of CLI, or CLI resources 225 with CLI above a second CLI threshold). For instance, in some cases, the CLI reporting configuration may cause the first UE 115-a to report CLI resources 225 associated with the lowest RSSI measurements (e.g., minSRS-RSSI), as well as CLI resources 225 associated with the highest RSSI measurements (e.g., maxSRS-RSSI).

In some implementations, the network entity 105-a may transmit or output additional control signaling to the first UE 115-a, the second UE 115-b, or both. In particular, the network entity 105-a may transmit or output additional control signaling in response to the CLI report 245 in an attempt to reduce or eliminate CLI 215 experienced at the first UE 115-a. Stated differently, the network entity 105-a may be configured to utilize information included within the CLI report 245 to reduce or mitigate CLI 215 experienced at the first UE 115-a by adjusting communications scheduled at the respective UEs 115-a, 115-b, such as a relative timing of uplink communications at the second UE 115-b and downlink communications at the first UE 115-a. Additionally, or alternatively, the network entity 105-a may attempt to reduce or eliminate CLI experienced at the first UE 115-a by adjusting (e.g., reducing) a transmit power used by the second UE 115-b to transmit uplink signals.

For example, the network entity 105-a may transmit/output additional control signaling that includes scheduling information associated with wireless communications scheduled at the first UE 115-a and/or the second UE 115-b, a transmission power associated with communications transmitted by the second UE 115-b, or both. For instance, the additional control signaling may include scheduling information for the first UE 115-a, the second UE 115-b, or both, where the scheduling information adjusts a relative timing of downlink communications at the first UE 115-a and uplink communications at the second UE 115-b in order to reduce CLI 215 experienced at the first UE 115-a. In particular, the third control signaling 220 may include scheduling information which schedules wireless communications at the first UE 115-a within resources that exhibit sufficiently low CLI 215, as indicated via the CLI report 245. By way of another example, the additional control signaling 220 may instruct the second UE 115-b to reduce a transmission power of uplink signals in order to reduce a likelihood or severity of CLI 215 experienced at the first UE 115-a which is attributable to the uplink signals.

Subsequently, the network entity 105-a may communicate with the first UE 115-a, the second UE 115-b, or both. In particular, the respective wireless devices (e.g., first UE 115-a, second UE 115-b, network entity 105-a) may perform communications with one another based on the CLI report 245, and/or in accordance with the additional control signaling transmitted by the network entity 105-a in response to the CLI report 245.

For example, the respective wireless devices may perform communications in accordance with scheduling information included within additional control signaling transmitted by the network entity 105-a. For instance, in cases where the CLI report 245 indicates a CLI resource 225 that exhibits a level of CLI below a CLI threshold, or a CLI resource 225 that exhibits the lowest level of CLI, the additional control signaling may schedule communications at the first UE 115-a within the indicated CLI resource 225, and the first UE 115-a may perform the scheduled communications accordingly.

By way of another example, in cases where the additional control signaling indicates a transmission power for the second UE 115-b, the second UE 115-b may transmit uplink signals in accordance with a transmission power that was indicated via the additional control signaling. In this regard, the respective wireless devices may perform wireless communications in accordance with the additional control signaling which is configured to reduce or eliminate CLI 215 experienced at the first UE 115-a.

In some cases, the first UE 115-a may stop CLI reporting. In other words, the first UE 115-a may refrain from transmitting additional CLI reports 245. In some cases, the first UE 115-a may stop CLI reporting in cases where trigger conditions for CLI reporting are not satisfied. For example, the first UE 115-a may stop CLI reporting if all CLI resources 225 exhibit CLI measurements above a CLI threshold (e.g., stop reporting if $CLI_{Resources} > CLI_{Thresh}$). Additionally, or alternatively, the first UE 115-a may stop CLI reporting if an average CLI measurement across the set of CLI resources 225 is above a CLI threshold (e.g., stop reporting if $CLI_{Avg} > CLI_{Thresh}$).

In some cases, the first UE 115-a may be configured to stop CLI reporting for least-interfering CLI resources 225, but may continue to perform CLI reporting for most-interfering CLI resources 225. For example, in cases where no CLI resources 225 satisfy a trigger condition for least-interfering CLI reporting, but at least one CLI resource 225 exhibits sufficiently high CLI 215, the first UE 115-a may continue to transmit CLI reports 245 which indicate most-interfering CLI resources 225 (e.g., CLI reports 245 indicating the CLI resources 225 with the highest CLI measurements, or CLI resources 225 that exhibit a level of CLI above some threshold).

Techniques described herein may enable the first UE 115-a (e.g., victim UE 115) to report CLI resources 225 that exhibit a sufficiently low level of CLI (e.g., CLI below a threshold), a quantity of least-interfering CLI resources 225, or both. Techniques for least-interfering CLI reporting may be enabled in addition to, or in the alternate to, other CLI reporting techniques for reporting most-interfering CLI resources 225. Accordingly, techniques described herein may improve a granularity at which CLI may be reported to the network, thereby providing the network with a more complete and comprehensive picture regarding CLI experienced at the first UE 115-a. Moreover, by enabling victim UEs 115 to report least-interfering CLI resources 225, techniques described herein may enable the network to schedule wireless communications at UEs 115 via resources that exhibit sufficiently low levels of CLI performance (e.g., resources that exhibit CLI below some threshold), which may thereby improve an efficiency and reliability of wireless communications performed within the wireless communications system 200.

Figure 3:
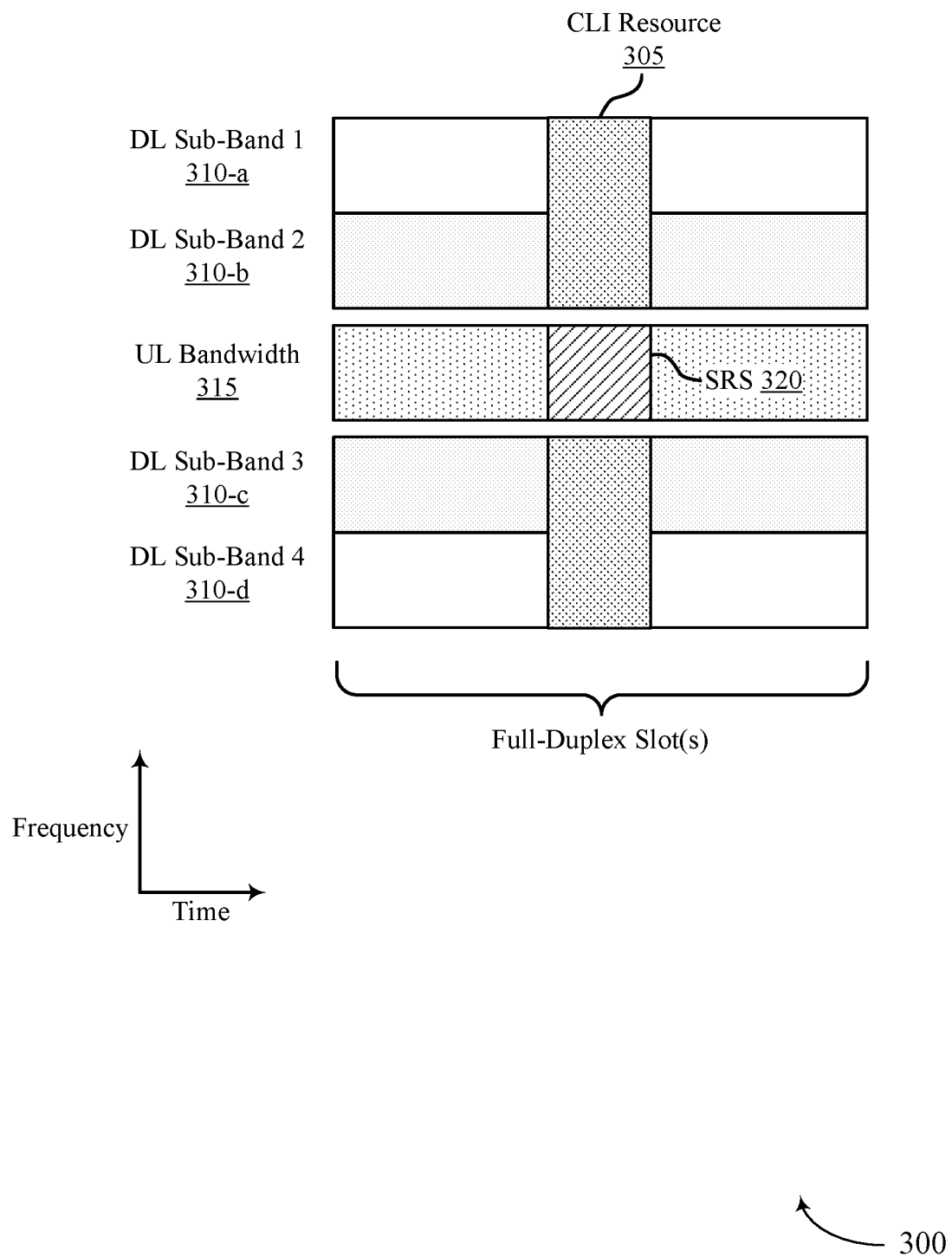
FIG. 3 illustrates an example of a resource configuration that supports techniques for CLI reporting trigger conditions in accordance with one or more aspects of the present disclosure.

FIG. 3 illustrates an example of a resource configuration 300 that supports techniques for CLI reporting trigger conditions in accordance with one or more aspects of the present disclosure. Aspects of the resource configuration 300 may implement, or be implemented by, aspects of the wireless communications system 100, the wireless communications system 200, or both.

The resource configuration 300 illustrates a CLI resource 305 which spans a set of sub-bands in the frequency domain. For example, the CLI resource 305 may span a set of downlink sub-bands 310 (e.g., first downlink sub-band 310-a, second downlink sub-band 310-b, third downlink sub-band 310-c, fourth downlink sub-band 310-d), as well as an uplink bandwidth 315 (e.g., uplink sub-band). The respective downlink sub-bands 310 may be positioned on either side of the uplink bandwidth 315 in the frequency domain. In some aspects, an aggressor UE 115 (e.g., second UE 115-b in FIG. 2) may be configured to transmit a reference signal within the uplink bandwidth 315, where a victim UE 115 (e.g., first UE 115-a in FIG. 2) may be configured to measure CLI experienced at the victim UE 115 within the CLI resource 305. For example, an aggressor UE 115 may transmit an SRS 320 within the uplink bandwidth 315, where a victim UE 115 is configured to measure CLI experienced within the downlink sub-bands 310-a, 310-b, 310-c, 310-d of the CLI resource.

Some conventional CLI reporting techniques enable UEs 115 to report one CLI metric per CLI resource 305. For example, in some cases, a CLI reporting configuration may cause a victim UE 115 to report a single CLI measurement for the CLI resource 305. However, each respective downlink sub-band 310 of the CLI resource 305 may experience varying levels of CLI. In particular, in the context of FDMed full-duplex communications at a network entity 105, leaked CLI from the uplink bandwidth 315 may vary across downlink sub-bands 310. For instance, the second downlink sub-band 310-b may experience a higher level of CLI as compared to the first downlink sub-band 310-a. In such cases, separate CLI resources may need to be configured per downlink sub-band to measure corresponding leaked CLI. However, such techniques may lead to an increase in control signaling associated with CLI reporting.

Accordingly, some aspects of the present disclosure may enable victim UEs 115 to perform wideband reporting, sub-band reporting, or both. In other words, techniques described herein may enable victim UEs 115 to evaluate a satisfaction of trigger conditions for CLI reporting based on average/median CLI measurements across CLI resources 305 (wideband reporting), based on CLI measurements for individual sub-bands (e.g., downlink sub-bands 310) within a CLI resource 305 (sub-band reporting), or both.

Stated differently, CLI reporting configurations described herein may include or define event trigger conditions for CLI reporting on a wideband basis, a per-sub-band basis, or both. In some aspects, different conditions can be configured for subband and wideband report.

In the context of wideband reporting, a victim UE 115 may transmit a CLI report in cases where CLI measurements averaged overall all sub-bands satisfies a condition. For example, referring to the resource configuration 300 and in the context of wideband reporting, a trigger condition for CLI reports may be satisfied if an average/median CLI measurement across the downlink sub-bands 310-a, 310-b, 310-c, and 310-d of the CLI resource 305 satisfies the trigger condition (e.g., average CLI across the downlink sub-bands 310 being greater than or less than some CLI threshold). In such cases, the CLI report may indicate the average/median CLI measurement across the downlink sub-bands 310 of the CLI resource 305.

Comparatively, in the context of sub-band reporting, a victim UE 115 may transmit a CLI report if CLI measurements for individual downlink sub-band(s) 310 within a respective CLI resource 305 satisfy some trigger condition. For example, a victim UE 115 may determine that CLI within the fourth downlink sub-band 310-d satisfies a trigger condition for CLI reporting, and may therefore transmit a CLI report based on the fourth downlink sub-band 310-d satisfying the trigger condition. In some cases, upon triggering the sub-band CLI report, and the victim UE 115 may report only the downlink sub-band 310 which satisfied the trigger condition (e.g., report an index and/or measurements associated with the fourth downlink sub-band 310-d). In additional or alternative implementations, upon triggering the CLI report based on the fourth downlink sub-band 310-d satisfying the trigger condition, the UE 115 may report a full sub-band vector associated with CLI measured throughout the CLI resource 305 (e.g., across all sub-bands 310 of the CLI resource 305).

Figure 4:
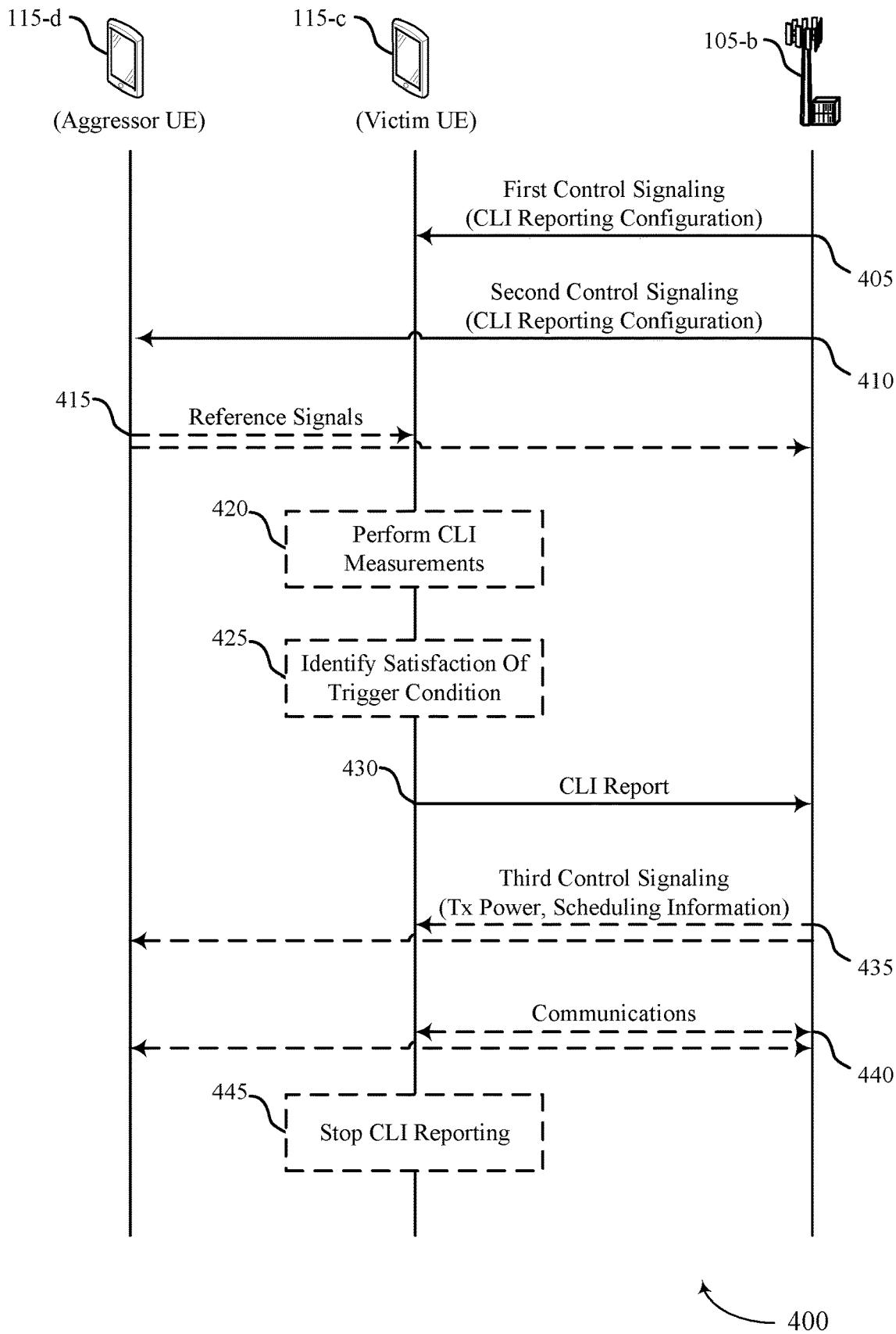
FIG. 4 illustrates an example of a process flow that supports techniques for CLI reporting trigger conditions in accordance with one or more aspects of the present disclosure.

FIG. 4 illustrates an example of a process flow 400 that supports techniques for CLI reporting trigger conditions in accordance with one or more aspects of the present disclosure. In some examples, aspects of the process flow 400 may implement, or be implemented by, aspects of the wireless communications system 100, the wireless communications system 200, the resource configuration 300, or any combination thereof. In particular, the process flow 400 illustrates a network entity 105-b configuring a victim UE 115-c and an aggressor UE 115-b with CLI reporting configurations for reporting least-interfering CLI resources, and receiving a CLI report from the victim UE 115-c indicating least-interfering CLI resources, as described with reference to FIGS. 1-3, among other aspects.

The process flow 400 may include a first UE 115-c, a second UE 115-b, and a network entity 105-b, which may be examples of UEs 115 and network entities 105 as described with reference to FIGS. 1-3. For example, the first UE 115-c and the second UE 115-d illustrated in FIG. 4 may be examples of the first UE 115-a and the second UE 115-b, respectively, as illustrated in FIG. 2. In this regard, the first UE 115-c may be an example of a victim UE 115, and the second UE 115-d may be an example of an aggressor UE 115. Similarly, the network entity 105-b illustrated in FIG. 3 may be an example of the network entity 105-a illustrated in FIG. 2.

In some examples, the operations illustrated in process flow 400 may be performed by hardware (e.g., including circuitry, processing blocks, logic components, and other components), code (e.g., software) executed by a processor, or any combination thereof. Alternative examples of the following may be implemented, where some steps are performed in a different order than described or are not performed at all. In some cases, steps may include additional features not mentioned below, or further steps may be added.

At 405, the network entity 105-*b* may transmit (e.g., output) first control signaling to the first UE 115-*c*. In some aspects, the first control signaling may include or indicate a CLI reporting configuration associated with a set of CLI resources. Moreover, the first control signaling may indicate parameters, resources, and/or characteristics for reporting least-interfering CLI resources in accordance with the CLI reporting configuration. Additionally, or alternatively, the first control signaling may indicate beams (e.g., Rx beams) usable by the first UE 115-*c* to receive signals within the CLI resources and perform CLI measurement. In this regard, the CLI reporting configuration may be configured to cause the first UE 115-*c* to report CLI resources which exhibit a lower level of CLI compared to other CLI resources, CLI resources that exhibit a level of CLI below some threshold, or both. The first control signaling may include RRC signaling, DCI signaling, MAC-CE signaling, or any combination thereof.

The first control signaling may indicate various parameters associated with the CLI reporting configuration for least-interfering CLI resources, including trigger conditions for CLI reporting, thresholds, time/frequency/spatial resources associated with the CLI resources, resources or transmission occasions for transmitting CLI reports, and the like.

For example, in some implementations, the first control signaling may indicate one or more trigger conditions used for triggering (e.g., activating) CLI reporting by the first UE 115-*c*. Trigger conditions for CLI reporting may be satisfied based on any number of parameters or characteristics associated with the first UE 115-*c*, the network, and the like. For instance, in some cases, the first control signaling may indicate a CLI threshold associated with a trigger condition for CLI reporting. In this example, the trigger condition may be satisfied if CLI measurements performed by the first UE 115-*c* satisfy (e.g., are greater than or equal to) the indicated CLI threshold.

By way of another example, in some implementations, the first control signaling may indicate a set of resources (e.g., transmission occasions) usable by the first UE 115-*c* to transmit CLI reports. In some cases, the resources/transmission occasions for CLI reports may originally be configured in an inactive state, where the resources/transmission occasions are transitioned to an active state (e.g., are activated, or otherwise usable) upon a satisfaction of a trigger condition for CLI reporting.

At 410, the network entity 105-*b* may transmit (e.g., output) second control signaling to the second UE 115-*d*. As noted previously herein with respect to the first control signaling at 405, the second control signaling at 410 may include or indicate a CLI reporting configuration including parameters, resources, and/or characteristics for CLI reporting. For example, the second control signaling may indicate time, frequency, and/or spatial resources associated with the CLI resources. In this regard, the second control signaling may indicate a set of CLI resources that are to be used for transmitting signals (e.g., reference signals, SRSs) for CLI reporting by the first UE 115-*c*. The second control signaling may include RRC signaling, DCI signaling, MAC-CE signaling, or any combination thereof.

At 415, the second UE 115-*d* may transmit signals (e.g., reference signals) to the network entity 105-*b*, the first UE 115-*c*, or both. For example, the second UE 115-*d* may transmit reference signals to the network entity 105-*b*, where at least a portion of the reference signals are received or otherwise intercepted by the first UE 115-*c*. As such, in some cases, signals transmitted by the second UE 115-*d* at 415 may be intended for the network entity 105-*b*, but may nevertheless be received or intercepted by the first UE 115-*c*. The reference signals may include any reference signal, including SRSs.

In some aspects, the second UE 115-*d* may transmit the reference signals at 415 based on receiving the second control signaling at 410 (e.g., in accordance with the CLI reporting configuration indicated via the second control signaling). In particular, the second UE 115-*d* may transmit the reference signals at 415 based on (e.g., within, using) the CLI resources indicated via the second control signaling. In this regard, the second UE 115-*d* may be configured to transmit the signals at 415 based on parameters or other indicators received via the second control signaling at 410. Similarly, the first UE 115-*c* may receive the reference signals at 415 based on (e.g., within, using) the set of CLI resources indicated via the first control signaling at 405.

At 420, the first UE 115-*c* may perform CLI measurements attributable to signals received from the second UE 115-*d* at 415. In particular, the first UE 115-*c* may perform the CLI measurements on signals received from the second UE 115-*d* within the set of CLI resources indicated via the first control signaling and in accordance with the CLI reporting configuration. In this regard, the first UE 115-*c* may perform CLI measurements based on receiving the first control signaling at 405, and receiving/intercepting the reference signals at 415. The CLI measurements may include RSSI measurements (e.g., CLI-RSSI), RSRP measurements (e.g., SRS-RSRP), RSRQ measurements, or any combination thereof.

In some aspects, the first UE 115-*c* may perform CLI measurements associated with each of (or at least a subset of) the set of CLI resources associated with the CLI reporting configuration. For example, in cases where the CLI reporting configuration includes first and second CLI resources, the first UE 115-*c* may perform a first CLI measurement on a first reference signal received within the first CLI resource, and a second CLI measurement on a second reference signal received within the second CLI resource.

At 425, the first UE 115-*c* may identify that one or more trigger conditions for CLI reporting have been satisfied. In particular, the first UE 115-*c* may identify the satisfaction of one or more trigger conditions at 425 based on receiving the first control signaling at 405, receiving the reference signals at 415, performing the CLI measurements at 420, or any combination thereof. For example, the first UE 115-*c* may identify a satisfaction of a trigger condition included within a set of trigger conditions indicated via the first control signaling.

In some cases, the first UE 115-*c* may evaluate whether trigger conditions have been satisfied or not by comparing CLI measurements to one or more thresholds. For example, in some cases, a trigger condition for CLI reporting may be satisfied if a CLI measurement for at least one CLI resource is less than or equal to a CLI threshold (e.g., trigger condition satisfied if $CLI_{ResourceN} \leq CLI_{Thresh}$). By way of another example, a trigger condition for CLI reporting may be satisfied if an average or median CLI measurement across the set of CLI resource is less than or equal to a CLI threshold (e.g., trigger condition satisfied if $CLI_{Avg} \leq CLI_{Thresh}$). Moreover, as described previously herein with respect to FIG. 3, the first UE 115-*c* may be configured to evaluate a satisfaction of trigger conditions for CLI reporting based on average/median CLI measurements across CLI resources (wideband reporting), based on CLI measurements for individual sub-bands within a CLI resource (sub-band reporting), or both.

At 430, the first UE 115-c may transmit, to the network entity 105-b, a CLI report associated with CLI experienced at the first UE 115-c. In other words, the first UE 115-c may transmit (and the network entity 105-b may obtain) a CLI report indicating the CLI measurements which were performed at 420. Moreover, the first UE 115-c may transmit the CLI report in accordance with the CLI reporting condition, and based on a satisfaction of one or more trigger conditions for CLI reporting.

In this regard, the first UE 115-c may transmit the CLI report at 430 based on receiving the first control signaling (e.g., CLI reporting configuration) at 405, receiving the reference signals at 415, performing the CLI measurements at 420, identifying the satisfaction of one or more trigger conditions at 425, or any combination thereof. For example, the first UE 115-c may transmit the CLI report within a resource (e.g., transmission occasion) associated with the CLI reporting configuration which was indicated via the first control signaling at 405.

In some implementations, the first UE 115-c may transmit the CLI report via L1 signaling, L3 signaling, or both. In this regard, in some aspects, the CLI report may be transmitted via a UCI message, a MAC-CE message, or both. As described previously herein, in some cases, the use of L1 signaling for communicating CLI reports may reduce a latency of CLI reporting, which may thereby result in faster and more efficient CLI mitigation at the first UE 115-c.

In some aspects, the CLI report may indicate least-interfering CLI resources at the first UE 115-c. For example, in some cases, the CLI report may indicate a first subset of CLI resources which exhibit a lower level of CLI compared to a second subset of CLI resources (e.g., lesser-interfering CLI resources). For instance, the CLI reporting configuration may include ten CLI resources, and may cause the first UE 115-c to report the three CLI resources that are associated with the lowest CLI measurements. In this regard, the CLI reporting configuration may cause the first UE 115-c to report a subset of the set of CLI resources that are associated with the lowest CLI measurements.

Additionally, or alternatively, the CLI report may indicate one or more CLI resources associated with CLI measurements that satisfy a CLI threshold (e.g., CLI resources associated with CLI measurements that are less than or equal to the CLI threshold). For example, in cases where the CLI reporting configuration includes ten CLI resources, and five of the CLI resources exhibit CLI measurements that satisfy (e.g., are less than or equal to) a CLI threshold, the CLI report may indicate the five respective CLI resources which satisfy the CLI threshold.

In some aspects, the CLI report may include indicators associated with the respective CLI resources (e.g., CLI indexes, CLI IDs), the CLI measurements, or both. For example, in some cases, the CLI report may simply indicate which CLI resources exhibit the lowest CLI (or CLI below some threshold), but may not actually indicate the CLI measurements for the reported CLI resources. In other cases, the CLI report may indicate both the least-interfering CLI resources as well as the CLI measurements associated with the least-interfering CLI resources. CLI resources and/or CLI measurements may be indicated via the CLI report via a table or other data object. Moreover, the CLI report may order, rank, or otherwise indicate a relative quality of CLI resources (e.g., rank the CLI resources from lowest to highest CLI, or vice versa).

As noted previously herein with respect to FIG. 3, the first UE 115-c may be configured to perform wideband reporting, sub-band reporting, or both. In this regard, the CLI report may indicate full CLI resources which satisfy the trigger condition, specific sub-bands which satisfy the trigger condition, or both. For example, in the context of wideband reporting, a trigger condition for CLI reports may be satisfied if a CLI measurement for any individual sub-band(s) satisfies a trigger condition, if an average/median CLI measurement across the sub-bands of the CLI resource satisfies the trigger condition, or both. In such cases, the CLI report may indicate the respective CLI resource which satisfies the trigger condition. Comparatively, in the context of sub-band reporting, a trigger condition for CLI reports may be satisfied if a CLI measurement for any individual sub-band(s) satisfies a trigger condition, in which case the CLI report may indicate the individual sub-band(s) which satisfy the trigger condition.

In some cases, the first UE 115-c may report most-interfering CLI resources in addition to reporting least-interfering CLI resources. For example, in some implementations, the CLI report may include a first subset of least-interfering CLI resources (e.g., X number of CLI resources that exhibit the lowest level of CLI, or CLI resources with CLI below a first CLI threshold), as well as a second subset of most-interfering CLI resources (e.g., Y number of CLI resources that exhibit the highest level of CLI, or CLI resources with CLI above a second CLI threshold).

At 435, the network entity 105-b may transmit third control signaling to the first UE 115-c, the second UE 115-d, or both. The network entity 105-b may transmit the third control signaling based on transmitting the first control signaling at 405, transmitting the second control signaling at 410, receiving the CLI report at 430, or any combination thereof. In particular, in some implementation, the network entity 105-b may transmit the third control signaling in response to the CLI report in an attempt to reduce or eliminate CLI experienced at the first UE 115-c. Stated differently, the network entity 105-b may be configured to utilize information included within the CLI report to reduce or mitigate CLI experienced at the first UE 115-c by adjusting communications scheduled at the respective UEs 115-c, 115-d, such as a relative timing of uplink communications at the second UE 115-d and downlink communications at the first UE 115-c. Additionally, or alternatively, the network entity 105-b may attempt to reduce or eliminate CLI experienced at the first UE 115-c by adjusting (e.g., reducing) a transmit power used by the second UE 115-d to transmit uplink signals.

For example, the third control signaling may include scheduling information associated with wireless communications scheduled at the first UE 115-c and/or the second UE 115-d, a transmission power associated with communications transmitted by the second UE 115-d, or both. For instance, the third control signaling may include scheduling information for the first UE 115-c, the second UE 115-d, or both, where the scheduling information adjusts a relative timing of downlink communications at the first UE 115-c and uplink communications at the second UE 115-d in order to reduce CLI experienced at the first UE 115-c. In particular, the third control signaling may include scheduling information which schedules wireless communications at the first UE 115-c within resources that exhibit sufficiently low CLI, as indicated via the CLI report. By way of another example, the third control signaling may instruct the second UE 115-*d* to reduce a transmission power of uplink signals in order to reduce a likelihood or severity of CLI experienced at the first UE 115-*c* which is attributable to the uplink signals.

At 440, the network entity 105-*b* may communicate with the first UE 115-*c*, the second UE 115-*d*, or both. In particular, the respective wireless devices (e.g., first UE 115-*c*, second UE 115-*d*, network entity 105-*b*) may perform communications at 440 based on the CLI report at 430, and/or in accordance with the third control signaling at 435.

For example, the respective wireless devices may perform communications in accordance with scheduling information included within the third control signaling. For instance, in cases where the CLI report indicates a CLI resource that exhibits a level of CLI below a CLI threshold, or a CLI resource that exhibits the lowest level of CLI, the third control signaling may schedule communications at the first UE 115-*c* within the indicated CLI resource, and the first UE 115-*c* may perform the scheduled communications at 440.

By way of another example, in cases where the third control signaling indicates a transmission power for the second UE 115-*d*, the second UE 115-*d* may transmit uplink signals in accordance with a transmission power that was indicated via the third control signaling. In this regard, the respective wireless devices may perform wireless communications in accordance with the third control signaling which is configured to reduce or eliminate CLI experienced at the first UE 115-*c*.

At 445, the first UE 115-*c* may stop CLI reporting. In other words, the first UE 115-*c* may refrain from transmitting additional CLI reports. In some cases, the first UE 115-*c* may stop CLI reporting in cases where trigger conditions for CLI reporting are not satisfied. For example, the first UE 115-*c* may stop CLI reporting if all CLI resources exhibit CLI measurements above a CLI threshold (e.g., stop reporting if $CLI_{Resources} > CLI_{Thresh}$). Additionally, or alternatively, the first UE 115-*c* may stop CLI reporting if an average CLI measurement across the set of CLI resources is above a CLI threshold (e.g., stop reporting if $CLI_{Avg} > CLI_{Thresh}$).

In some cases, the first UE 115-*c* may be configured to stop CLI reporting for least-interfering CLI resources, but may continue to perform CLI reporting for most-interfering CLI resources. For example, in cases where no CLI resources satisfy a trigger condition for least-interfering CLI reporting, but at least one CLI resource exhibits sufficiently high CLI, the first UE 115-*c* may continue to transmit CLI reports which indicate most-interfering CLI resources (e.g., CLI reports indicating the CLI resources with the highest CLI measurements, or CLI resources that exhibit a level of CLI above some threshold).

Techniques described herein may enable the first UE 115-*c* (e.g., victim UE 115) to report CLI resources that exhibit a sufficiently low level of CLI (e.g., CLI below a threshold), a quantity of least-interfering CLI resources, or both. Techniques for least-interfering CLI reporting may be enabled in addition to, or in the alternate to, other CLI reporting techniques for reporting most-interfering CLI resources. Accordingly, techniques described herein may improve a granularity at which CLI may be reported to the network, thereby providing the network with a more complete and comprehensive picture regarding CLI experienced at the first UE 115-*c*. Moreover, by enabling victim UEs 115 to report least-interfering CLI resources, techniques described herein may enable the network to schedule wireless communications at UEs 115 via resources that exhibit sufficiently low levels of CLI performance (e.g., resources that exhibit CLI below some threshold), which may thereby improve an efficiency and reliability of wireless communications performed within the wireless communications system.

Figure 5:
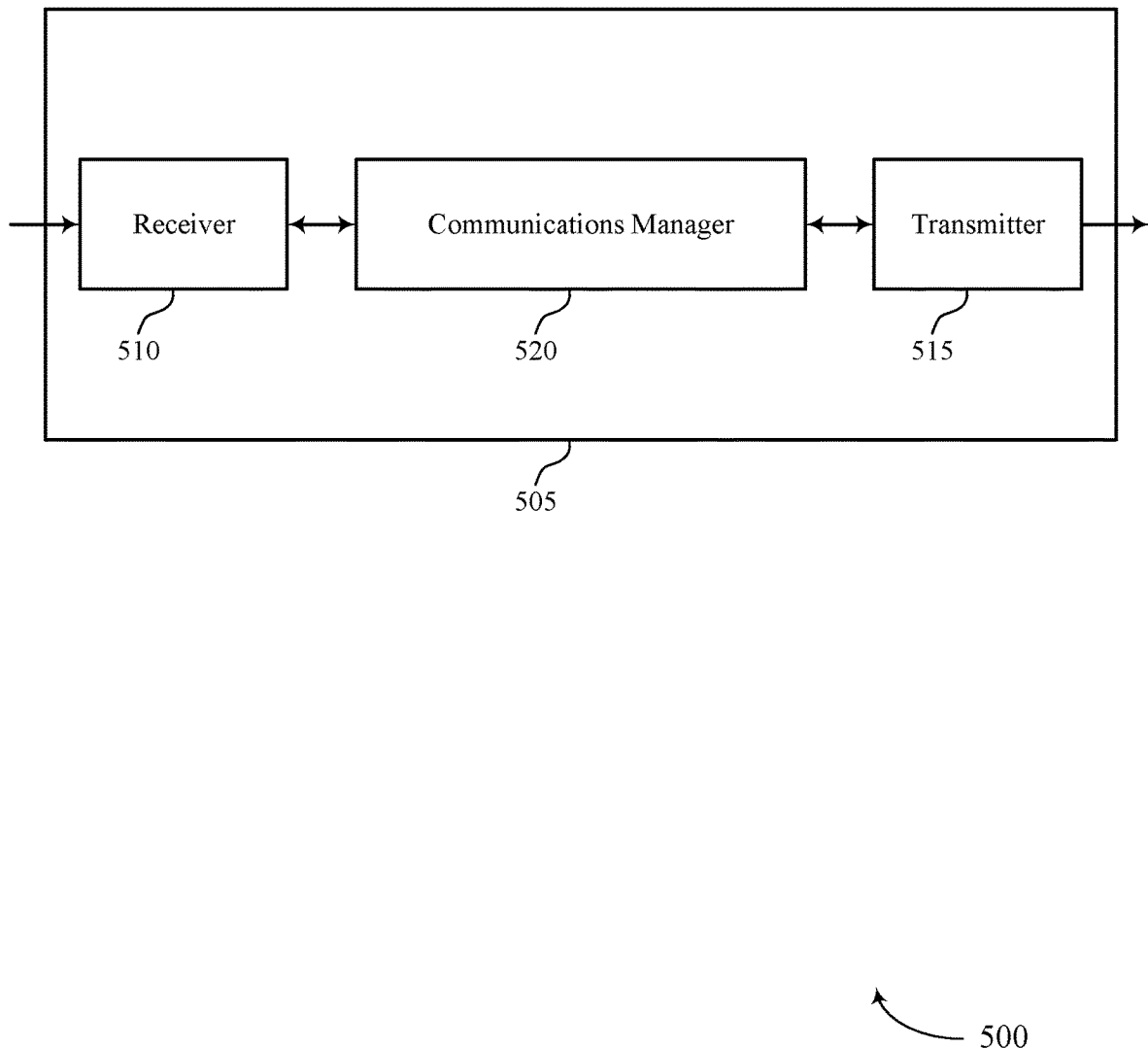
FIGS. 5 and 6 show block diagrams of devices that support techniques for CLI reporting trigger conditions in accordance with one or more aspects of the present disclosure.

FIG. 5 shows a block diagram 500 of a device 505 that supports techniques for CLI reporting trigger conditions in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for CLI reporting trigger conditions). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for CLI reporting trigger conditions). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for CLI reporting trigger conditions as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a first UE in accordance with examples as disclosed herein. For example, the communications manager 520 may be configured as or otherwise support a means for receiving control signaling indicating a CLI reporting configuration associated with a set of CLI resources, the set of CLI resources including at least a first CLI resource and a second CLI resource, where the first CLI resource is associated with a first level of CLI and the second CLI resource is associated with a second level of CLI that is less than the first level. The communications manager 520 may be configured as or otherwise support a means for performing CLI measurements on signals received from a second UE within the set of CLI resources based on the CLI reporting configuration. The communications manager 520 may be configured as or otherwise support a means for transmitting, based on performing the CLI measurements, a CLI report identifying a CLI resource from the set of CLI resources, where the CLI resource is associated with a CLI measurement that fails to satisfy a CLI threshold, or where the CLI resource is associated with at least the second CLI resource associated with the second level of CLI.

By including or configuring the communications manager 520 in accordance with examples as described herein, the device 505 (e.g., a processor controlling or otherwise coupled with the receiver 510, the transmitter 515, the communications manager 520, or a combination thereof) may support techniques which enable victim UEs 115 to report CLI resources that exhibit a sufficiently low level of CLI (e.g., CLI below a threshold), a quantity of least-interfering CLI resources, or both. Techniques for least-interfering CLI reporting may be enabled in addition to, or in the alternate to, other CLI reporting techniques for reporting most-interfering CLI resources. Accordingly, techniques described herein may improve a granularity at which CLI may be reported to the network, thereby providing the network with a more complete and comprehensive picture regarding CLI experienced at the respective UEs 115. Moreover, by enabling UEs 115 to report least-interfering CLI resources, techniques described herein may enable the network to schedule wireless communications at UEs 115 via resources that exhibit sufficiently low levels of CLI performance (e.g., resources that exhibit CLI below some threshold), which may thereby improve an efficiency and reliability of wireless communications performed within the wireless communications system.

Figure 6:
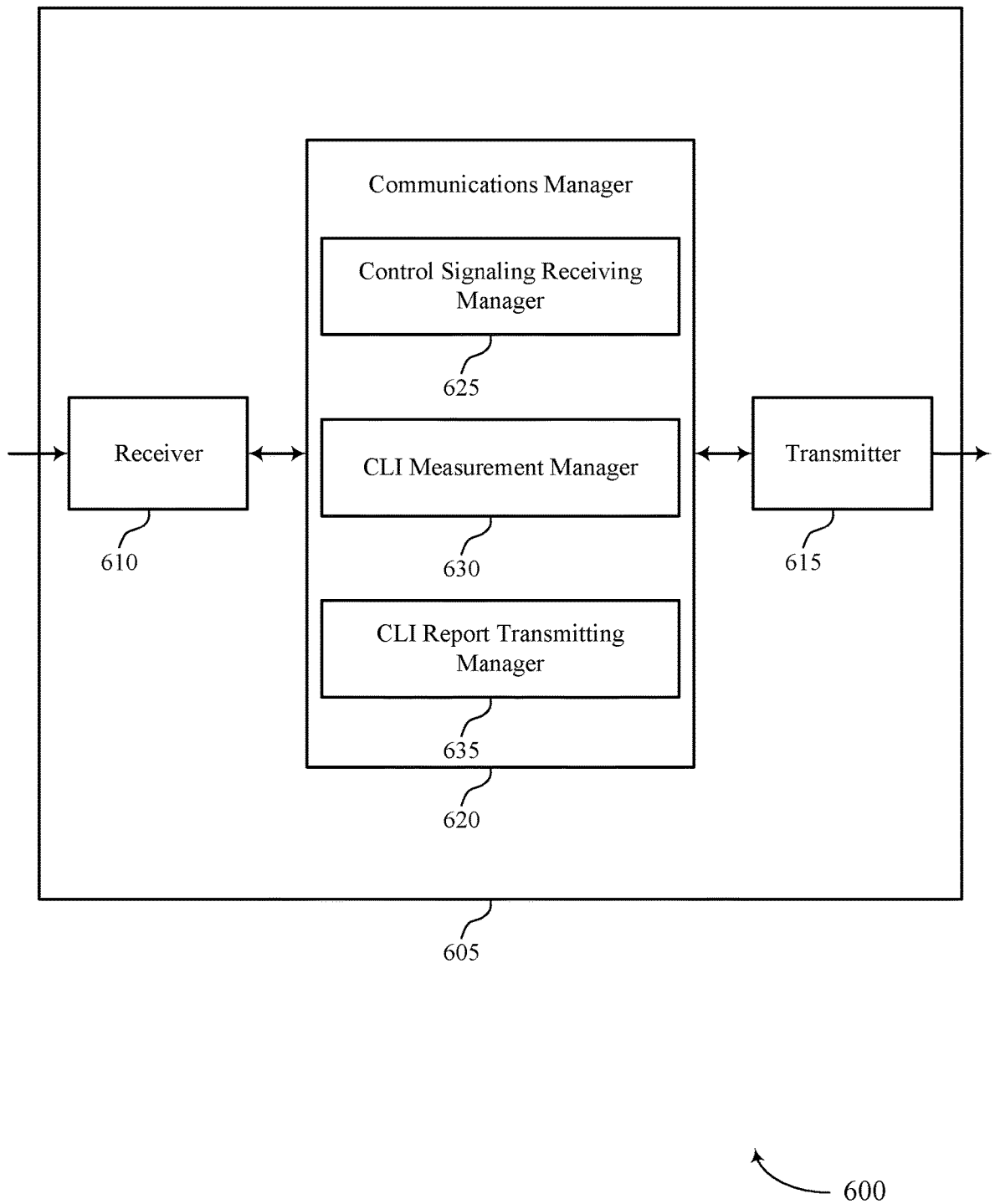

FIG. 6 shows a block diagram 600 of a device 605 that supports techniques for CLI reporting trigger conditions in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for CLI reporting trigger conditions). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for CLI reporting trigger conditions). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for CLI reporting trigger conditions as described herein. For example, the communications manager 620 may include a control signaling receiving manager 625, a CLI measurement manager 630, a CLI report transmitting manager 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a first UE in accordance with examples as disclosed herein. The control signaling receiving manager 625 may be configured as or otherwise support a means for receiving control signaling indicating a CLI reporting configuration associated with a set of CLI resources, the set of CLI resources including at least a first CLI resource and a second CLI resource, where the first CLI resource is associated with a first level of CLI and the second CLI resource is associated with a second level of CLI that is less than the first level. The CLI measurement manager 630 may be configured as or otherwise support a means for performing CLI measurements on signals received from a second UE within the set of CLI resources based on the CLI reporting configuration. The CLI report transmitting manager 635 may be configured as or otherwise support a means for transmitting, based on performing the CLI measurements, a CLI report identifying a CLI resource from the set of CLI resources, where the CLI resource is associated with a CLI measurement that fails to satisfy a CLI threshold, or where the CLI resource is associated with at least the second CLI resource associated with the second level of CLI.

Figure 7:
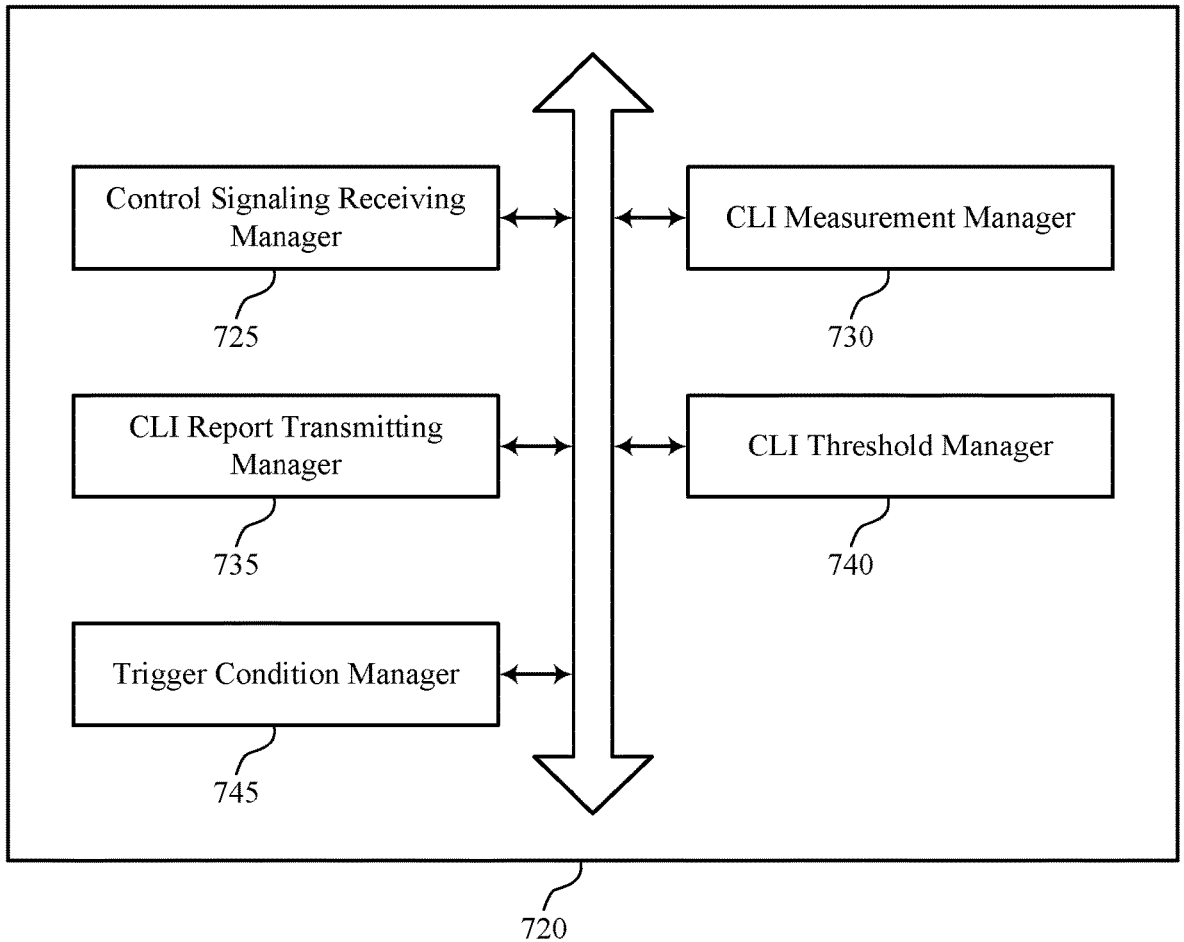
FIG. 7 shows a block diagram of a communications manager that supports techniques for CLI reporting trigger conditions in accordance with one or more aspects of the present disclosure.

FIG. 7 shows a block diagram 700 of a communications manager 720 that supports techniques for CLI reporting trigger conditions in accordance with one or more aspects of the present disclosure. The communications manager 720 may be an example of aspects of a communications manager 520, a communications manager 620, or both, as described herein. The communications manager 720, or various components thereof, may be an example of means for performing various aspects of techniques for CLI reporting trigger conditions as described herein. For example, the communications manager 720 may include a control signaling receiving manager 725, a CLI measurement manager 730, a CLI report transmitting manager 735, a CLI threshold manager 740, a trigger condition manager 745, or any combination thereof. Each of these components may communicate, directly or indirectly, with one another (e.g., via one or more buses).

The communications manager 720 may support wireless communication at a first UE in accordance with examples as disclosed herein. The control signaling receiving manager 725 may be configured as or otherwise support a means for receiving control signaling indicating a CLI reporting configuration associated with a set of CLI resources, the set of CLI resources including at least a first CLI resource and a second CLI resource, where the first CLI resource is associated with a first level of CLI and the second CLI resource is associated with a second level of CLI that is less than the first level. The CLI measurement manager 730 may be configured as or otherwise support a means for performing CLI measurements on signals received from a second UE within the set of CLI resources based on the CLI reporting configuration. The CLI report transmitting manager 735 may be configured as or otherwise support a means for transmitting, based on performing the CLI measurements, a CLI report identifying a CLI resource from the set of CLI resources, where the CLI resource is associated with a CLI measurement that fails to satisfy a CLI threshold, or where the CLI resource is associated with at least the second CLI resource associated with the second level of CLI.

In some examples, the CLI threshold manager 740 may be configured as or otherwise support a means for receiving the CLI threshold via the control signaling, where transmitting the CLI report is based on receiving the CLI threshold.

In some examples, the control signaling receiving manager 725 may be configured as or otherwise support a means for receiving, via the control signaling, one or more trigger conditions associated with the CLI reporting configuration. In some examples, the trigger condition manager 745 may be configured as or otherwise support a means for identifying a satisfaction of at least one trigger condition of the one or more trigger conditions based on performing the CLI measurements, where transmitting the CLI report is based on identifying the satisfaction of the at least one trigger condition.

In some examples, the control signaling receiving manager 725 may be configured as or otherwise support a means for receiving, via the control signaling, a set of multiple transmission occasions associated with the CLI reporting configuration. In some examples, the CLI report transmitting manager 735 may be configured as or otherwise support a means for transmitting the CLI report within a transmission occasion of the set of multiple transmission occasions based on identifying the satisfaction of the at least one trigger condition.

In some examples, the trigger condition manager 745 may be configured as or otherwise support a means for identifying a satisfaction of a trigger condition for CLI reporting based on identifying that a CLI measurement is less than or equal to the CLI threshold, where the CLI measurement fails to satisfy the CLI threshold based on being less than or equal to the CLI threshold, where transmitting the CLI report is based on the satisfaction of the trigger condition.

In some examples, the CLI measurement manager 730 may be configured as or otherwise support a means for performing additional CLI measurements on signals received from the second UE within the set of CLI resources based on the CLI reporting configuration. In some examples, the CLI report transmitting manager 735 may be configured as or otherwise support a means for refraining from transmitting an additional CLI report based on at least one of the additional CLI measurements being greater than or equal to the CLI threshold, being greater than or equal to an additional CLI threshold, or both.

In some examples, the CLI measurements include a set of CLI measurements corresponding to respective CLI resources of the set of CLI resources, and the CLI report transmitting manager 735 may be configured as or otherwise support a means for transmitting, via the CLI report, an indication of a subset of the set of CLI resources associated with lowest CLI measurements from among the set of CLI measurements, where the subset of the set of CLI resources includes the CLI resource.

In some examples, the CLI report transmitting manager 735 may be configured as or otherwise support a means for transmitting, via the CLI report, an indication of an additional CLI resource from the set of CLI resources, where the additional CLI resource is associated with an additional CLI measurement that satisfies the CLI threshold, or where the additional CLI resource is associated with at least the first CLI resource associated with the first level of CLI.

In some examples, the CLI measurement associated with the CLI resource includes a lowest CLI measurement from among a set of multiple CLI measurements associated with the set of CLI resources. In some examples, the CLI report transmitting manager 735 may be configured as or otherwise support a means for transmitting an indication of the CLI measurement via the CLI report. In some examples, the CLI resource fails to satisfy the CLI threshold based on being less than or equal to the CLI threshold.

In some examples, the CLI resource spans a set of sub-bands. In some examples, the CLI measurement associated with the CLI resource includes a set of measurements associated with the set of sub-bands. In some examples, the CLI measurement fails to satisfy the CLI threshold based on at least one measurement of the set of measurements failing to satisfy the CLI threshold, failing to satisfy an additional CLI threshold, or both.

In some examples, the CLI report transmitting manager 735 may be configured as or otherwise support a means for transmitting, via the CLI report, an indication of at least one sub-band from the set of sub-bands associated with the at least one measurement based on the at least one measurement failing to satisfy the CLI threshold, failing to satisfy an additional CLI threshold, or both.

In some examples, the CLI resource spans a set of sub-bands. In some examples, the CLI measurement associated with the CLI resource includes a set of measurements associated with the set of sub-bands. In some examples, the CLI measurement fails to satisfy the CLI threshold based on an average of the set of measurements failing to satisfy the CLI threshold.

In some examples, the control signaling receiving manager 725 may be configured as or otherwise support a means for receiving, via the control signaling, a set of transmission occasions associated with the CLI reporting configuration, where the CLI report is transmitted within a transmission occasion of the set of transmission occasions.

In some examples, the CLI report is transmitted via L1 signaling. In some examples, the signals received from the second UE include SRSs.

Figure 8:
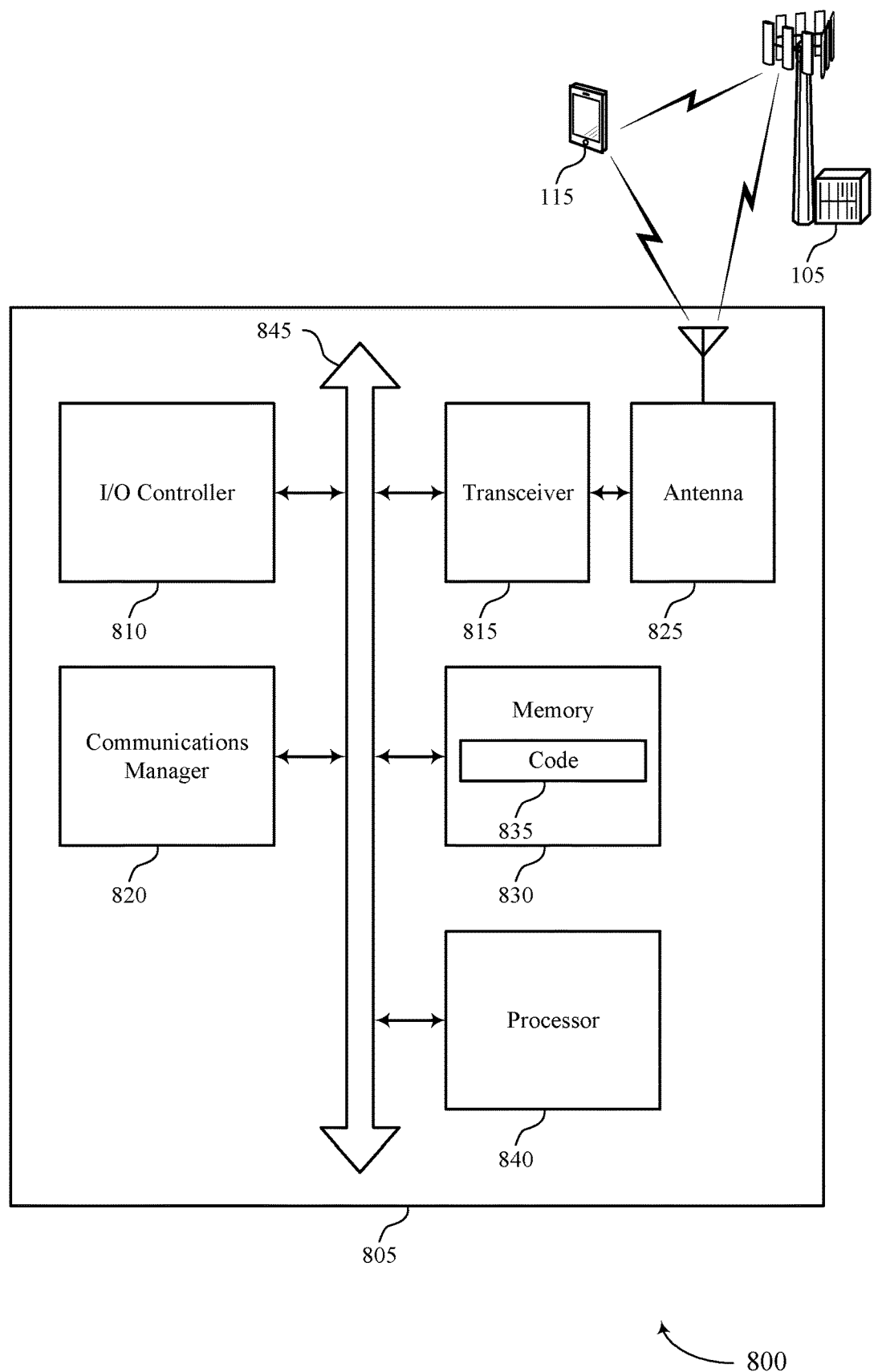
FIG. 8 shows a diagram of a system including a device that supports techniques for CLI reporting trigger conditions in accordance with one or more aspects of the present disclosure.

FIG. 8 shows a diagram of a system 800 including a device 805 that supports techniques for CLI reporting trigger conditions in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for CLI reporting trigger conditions). For example, the device 805 or a component of the device 805 may include a processor 840 and memory 830 coupled with or to the processor 840, the processor 840 and memory 830 configured to perform various functions described herein.

The communications manager 820 may support wireless communication at a first UE in accordance with examples as disclosed herein. For example, the communications manager 820 may be configured as or otherwise support a means for receiving control signaling indicating a CLI reporting configuration associated with a set of CLI resources, the set of CLI resources including at least a first CLI resource and a second CLI resource, where the first CLI resource is associated with a first level of CLI and the second CLI resource is associated with a second level of CLI that is less than the first level. The communications manager 820 may be configured as or otherwise support a means for performing CLI measurements on signals received from a second UE within the set of CLI resources based on the CLI reporting configuration. The communications manager 820 may be configured as or otherwise support a means for transmitting, based on performing the CLI measurements, a CLI report identifying a CLI resource from the set of CLI resources, where the CLI resource is associated with a CLI measurement that fails to satisfy a CLI threshold, or where the CLI resource is associated with at least the second CLI resource associated with the second level of CLI.

By including or configuring the communications manager 820 in accordance with examples as described herein, the device 805 may support techniques which enable victim UEs 115 to report CLI resources that exhibit a sufficiently low level of CLI (e.g., CLI below a threshold), a quantity of least-interfering CLI resources, or both. Techniques for least-interfering CLI reporting may be enabled in addition to, or in the alternate to, other CLI reporting techniques for reporting most-interfering CLI resources. Accordingly, techniques described herein may improve a granularity at which CLI may be reported to the network, thereby providing the network with a more complete and comprehensive picture regarding CLI experienced at the respective UEs 115. Moreover, by enabling UEs 115 to report least-interfering CLI resources, techniques described herein may enable the network to schedule wireless communications at UEs 115 via resources that exhibit sufficiently low levels of CLI performance (e.g., resources that exhibit CLI below some threshold), which may thereby improve an efficiency and reliability of wireless communications performed within the wireless communications system.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for CLI reporting trigger conditions as described herein, or the processor 840 and the memory 830 may be otherwise configured to perform or support such operations.

Figure 9:
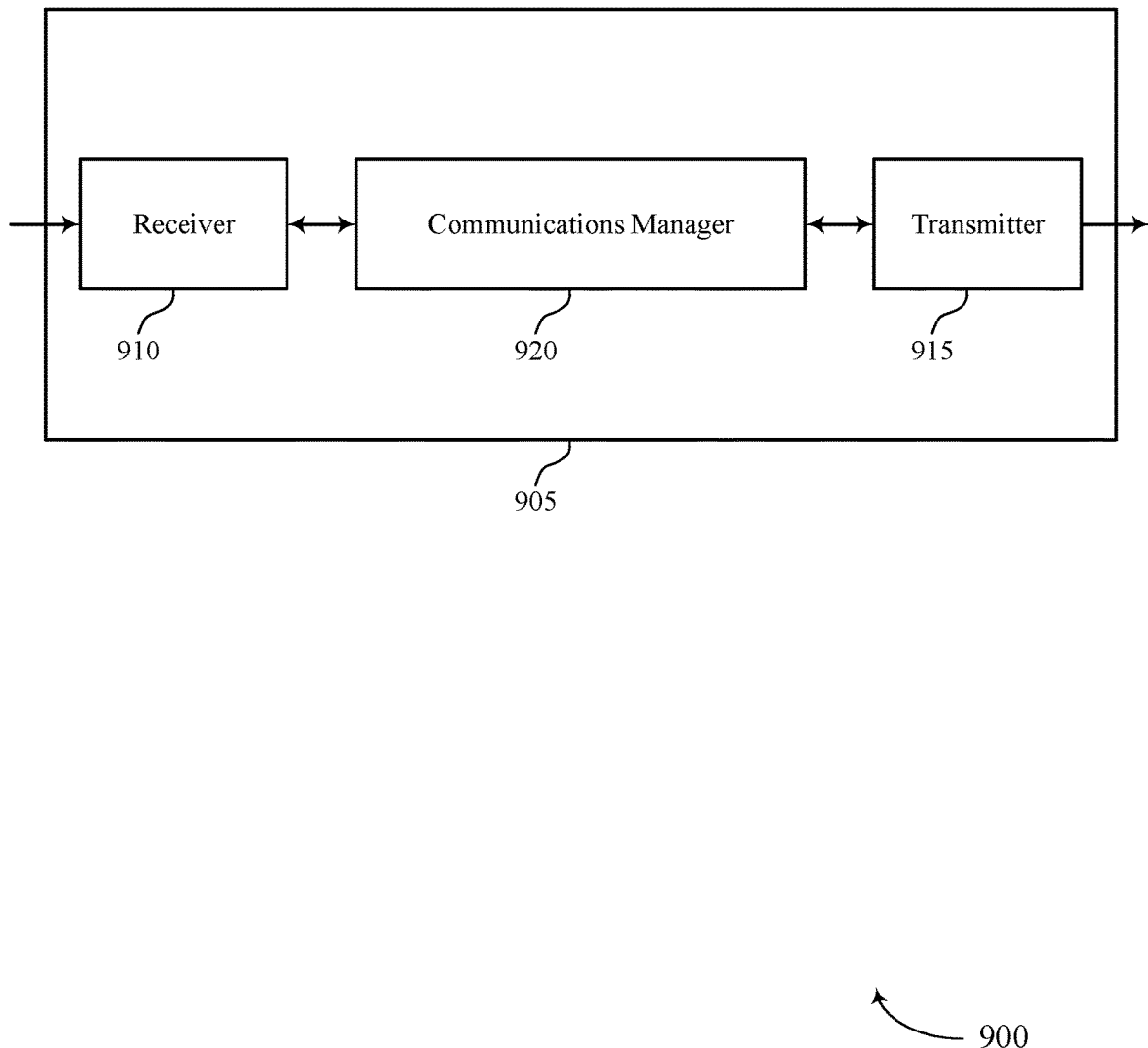
FIGS. 9 and 10 show block diagrams of devices that support techniques for CLI reporting trigger conditions in accordance with one or more aspects of the present disclosure.

FIG. 9 shows a block diagram 900 of a device 905 that supports techniques for CLI reporting trigger conditions in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of techniques for CLI reporting trigger conditions as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a network entity in accordance with examples as disclosed herein. For example, the communications manager 920 may be configured as or otherwise support a means for transmitting, to a first UE, control signaling indicating a CLI reporting configuration associated with a set of CLI resources, the set of CLI resources including at least a first CLI resource and a second CLI resource, where the first CLI resource is associated with a first level of CLI and the second CLI resource is associated with a second level of CLI that is less than the first level. The communications manager 920 may be configured as or otherwise support a means for receiving, from the first UE based on the CLI reporting configuration, a CLI report identifying a CLI resource from the set of CLI resources, where the CLI resource is associated with a CLI measurement that fails to satisfy a CLI threshold, or where the CLI resource is associated with at least the second CLI resource associated with the second level of CLI. The communications manager 920 may be configured as or otherwise support a means for communicating with the first UE, a second UE, or both, based on the CLI report.

By including or configuring the communications manager 920 in accordance with examples as described herein, the device 905 (e.g., a processor controlling or otherwise coupled with the receiver 910, the transmitter 915, the communications manager 920, or a combination thereof) may support techniques which enable victim UEs 115 to report CLI resources that exhibit a sufficiently low level of CLI (e.g., CLI below a threshold), a quantity of least-interfering CLI resources, or both. Techniques for least-interfering CLI reporting may be enabled in addition to, or in the alternate to, other CLI reporting techniques for reporting most-interfering CLI resources. Accordingly, techniques described herein may improve a granularity at which CLI may be reported to the network, thereby providing the network with a more complete and comprehensive picture regarding CLI experienced at the respective UEs 115. Moreover, by enabling UEs 115 to report least-interfering CLI resources, techniques described herein may enable the network to schedule wireless communications at UEs 115 via resources that exhibit sufficiently low levels of CLI performance (e.g., resources that exhibit CLI below some threshold), which may thereby improve an efficiency and reliability of wireless communications performed within the wireless communications system.

Figure 10:
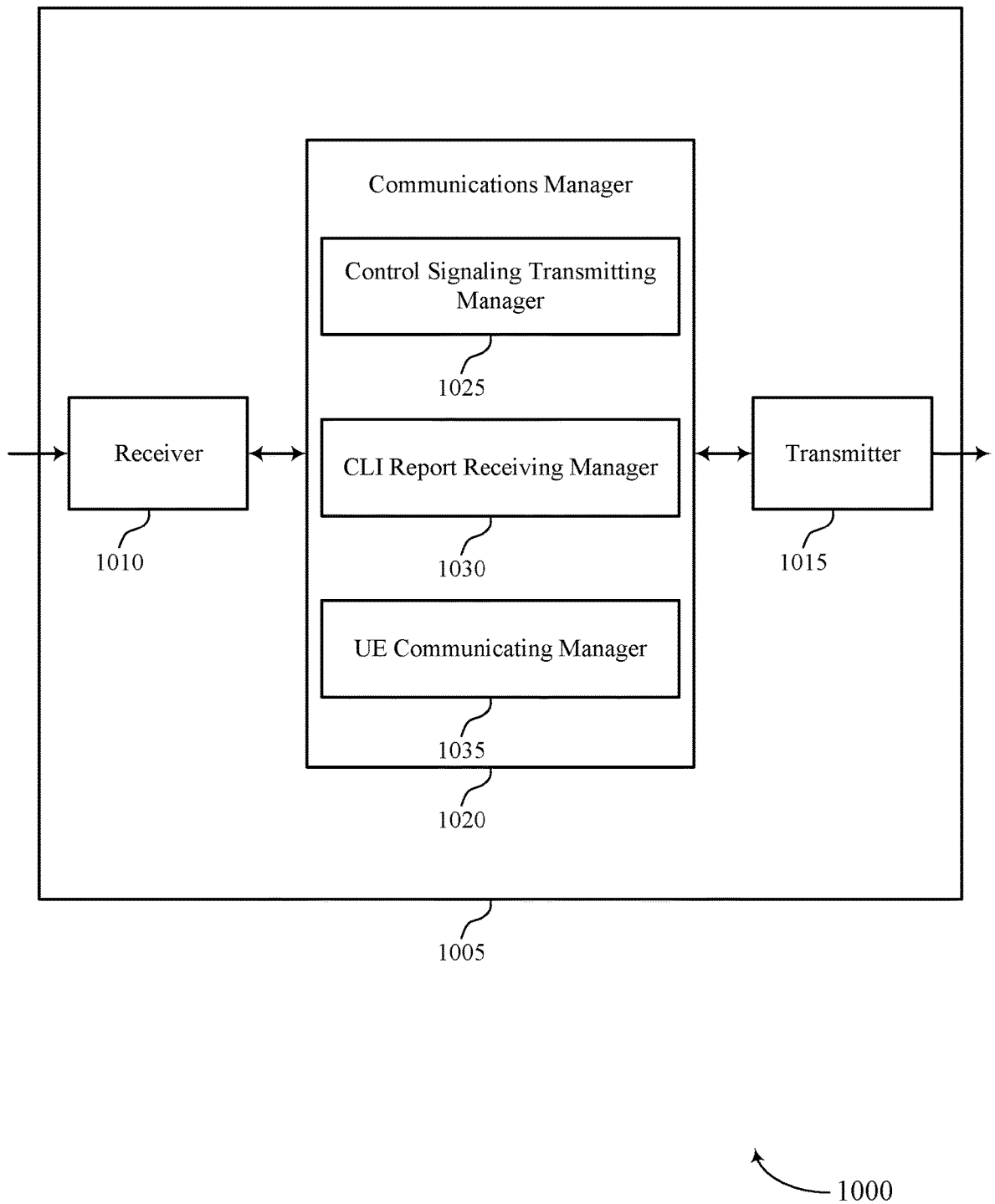

FIG. 10 shows a block diagram 1000 of a device 1005 that supports techniques for CLI reporting trigger conditions in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of techniques for CLI reporting trigger conditions as described herein. For example, the communications manager 1020 may include a control signaling transmitting manager 1025, a CLI report receiving manager 1030, a UE communicating manager 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. The control signaling transmitting manager 1025 may be configured as or otherwise support a means for transmitting, to a first UE, control signaling indicating a CLI reporting configuration associated with a set of CLI resources, the set of CLI resources including at least a first CLI resource and a second CLI resource, where the first CLI resource is associated with a first level of CLI and the second CLI resource is associated with a second level of CLI that is less than the first level. The CLI report receiving manager 1030 may be configured as or otherwise support a means for receiving, from the first UE based on the CLI reporting configuration, a CLI report identifying a CLI resource from the set of CLI resources, where the CLI resource is associated with a CLI measurement that fails to satisfy a CLI threshold, or where the CLI resource is associated with at least the second CLI resource associated with the second level of CLI. The UE communicating manager 1035 may be configured as or otherwise support a means for communicating with the first UE, a second UE, or both, based on the CLI report.

Figure 11:
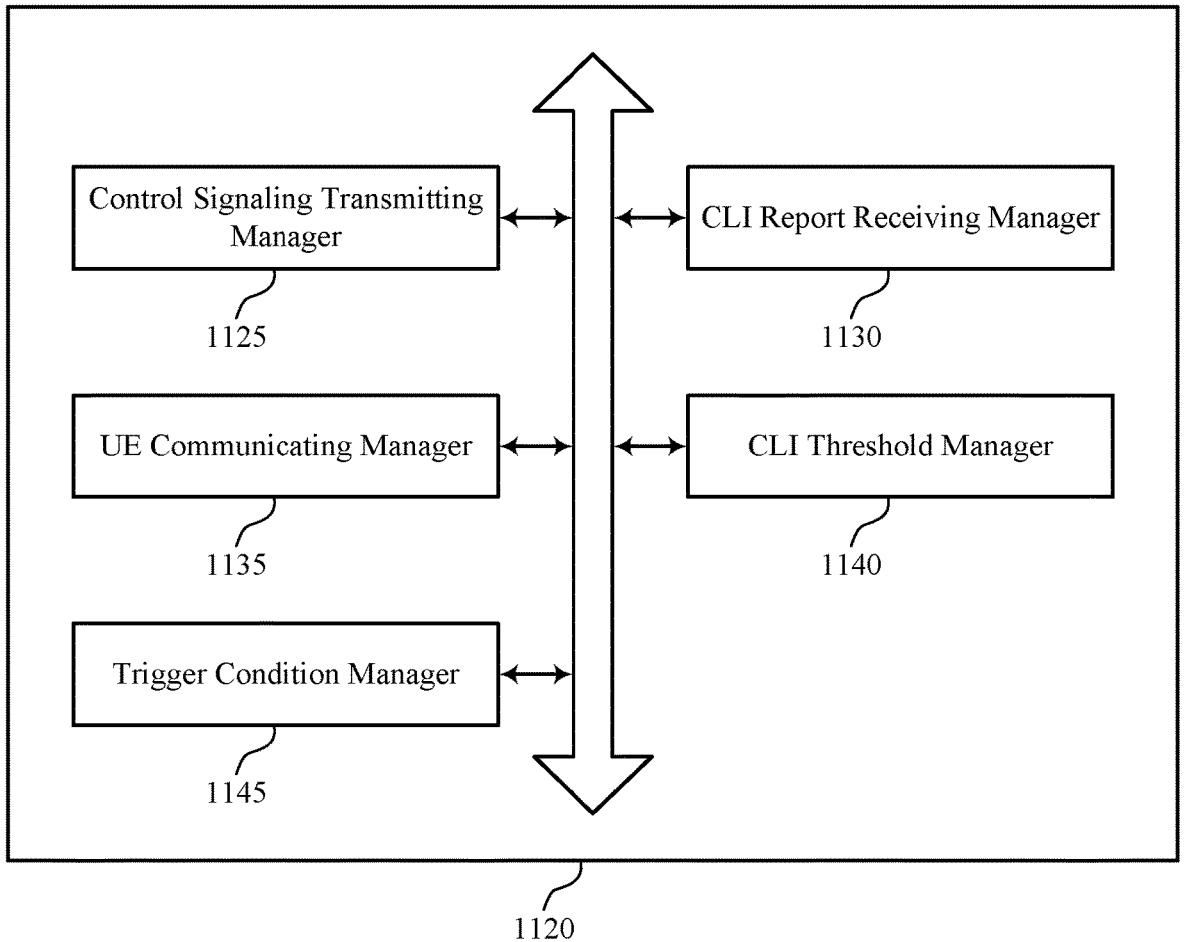
FIG. 11 shows a block diagram of a communications manager that supports techniques for CLI reporting trigger conditions in accordance with one or more aspects of the present disclosure.

FIG. 11 shows a block diagram 1100 of a communications manager 1120 that supports techniques for CLI reporting trigger conditions in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of techniques for CLI reporting trigger conditions as described herein. For example, the communications manager 1120 may include a control signaling transmitting manager 1125, a CLI report receiving manager 1130, a UE communicating manager 1135, a CLI threshold manager 1140, a trigger condition manager 1145, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communication at a network entity in accordance with examples as disclosed herein. The control signaling transmitting manager 1125 may be configured as or otherwise support a means for transmitting, to a first UE, control signaling indicating a CLI reporting configuration associated with a set of CLI resources, the set of CLI resources including at least a first CLI resource and a second CLI resource, where the first CLI resource is associated with a first level of CLI and the second CLI resource is associated with a second level of CLI that is less than the first level. The CLI report receiving manager 1130 may be configured as or otherwise support a means for receiving, from the first UE based on the CLI reporting configuration, a CLI report identifying a CLI resource from the set of CLI resources, where the CLI resource is associated with a CLI measurement that fails to satisfy a CLI threshold, or where the CLI resource is associated with at least the second CLI resource associated with the second level of CLI. The UE communicating manager 1135 may be configured as or otherwise support a means for communicating with the first UE, a second UE, or both, based on the CLI report.

In some examples, the CLI threshold manager 1140 may be configured as or otherwise support a means for transmitting the CLI threshold via the control signaling, where receiving the CLI report is based on transmitting the CLI threshold.

In some examples, the trigger condition manager 1145 may be configured as or otherwise support a means for transmitting, via the control signaling, one or more trigger conditions associated with the CLI reporting configuration, where receiving the CLI report is based on a satisfaction of at least one trigger condition of the one or more trigger conditions.

In some examples, the control signaling transmitting manager 1125 may be configured as or otherwise support a means for transmitting, via the control signaling, a set of multiple transmission occasions associated with the CLI reporting configuration. In some examples, the CLI report receiving manager 1130 may be configured as or otherwise support a means for receiving the CLI report within a transmission occasion of the set of multiple transmission occasions based on the satisfaction of the at least one trigger condition.

In some examples, the CLI report receiving manager 1130 may be configured as or otherwise support a means for receiving the CLI report based on a satisfaction of a trigger condition for CLI reporting, where the satisfaction of the trigger condition is based on the CLI measurement being less than or equal to the CLI threshold, where the CLI measurement fails to satisfy the CLI threshold based on being less than or equal to the CLI threshold.

In some examples, the CLI measurement is included within a set of CLI measurements corresponding to respective CLI resources of the set of CLI resources, and the CLI report receiving manager 1130 may be configured as or otherwise support a means for receiving, via the CLI report, an indication of a subset of the set of CLI resources associated with lowest CLI measurements from among the set of CLI measurements, where the subset of CLI resources includes the CLI resource.

In some examples, the CLI report receiving manager 1130 may be configured as or otherwise support a means for receiving, via the CLI report, an indication of an additional CLI resource from the set of CLI resources, where the additional CLI resource is associated with an additional CLI measurement that satisfies the CLI threshold, or where the additional CLI resource is associated with at least the first CLI resource associated with the first level of CLI.

In some examples, the CLI measurement associated with the CLI resource includes a lowest CLI measurement from among a set of multiple CLI measurements associated with the set of CLI resources. In some examples, the CLI report receiving manager 1130 may be configured as or otherwise support a means for receiving an indication of the CLI measurement via the CLI report. In some examples, the CLI resource fails to satisfy the CLI threshold based on being less than or equal to the CLI threshold.

In some examples, the CLI resource spans a set of sub-bands. In some examples, the CLI measurement associated with the CLI resource includes a set of measurements associated with the set of sub-bands. In some examples, the CLI measurement fails to satisfy the CLI threshold based on at least one measurement of the set of measurements failing to satisfy the CLI threshold, failing to satisfy an additional CLI threshold, or both.

In some examples, the CLI report receiving manager 1130 may be configured as or otherwise support a means for receiving, via the CLI report, an indication of at least one sub-band from the set of sub-bands associated with the at least one measurement based on the at least one measurement failing to satisfy the CLI threshold, failing to satisfy an additional CLI threshold, or both.

In some examples, the CLI resource spans a set of sub-bands. In some examples, the CLI measurement associated with the CLI resource includes a set of measurements associated with the set of sub-bands. In some examples, the CLI measurement fails to satisfy the CLI threshold based on an average of the set of measurements failing to satisfy the CLI threshold.

In some examples, the control signaling transmitting manager 1125 may be configured as or otherwise support a means for transmitting, via the control signaling, a set of transmission occasions associated with the CLI reporting configuration, where the CLI report is received within a transmission occasion of the set of transmission occasions.

In some examples, the CLI report is received via L1 signaling.

Figure 12:
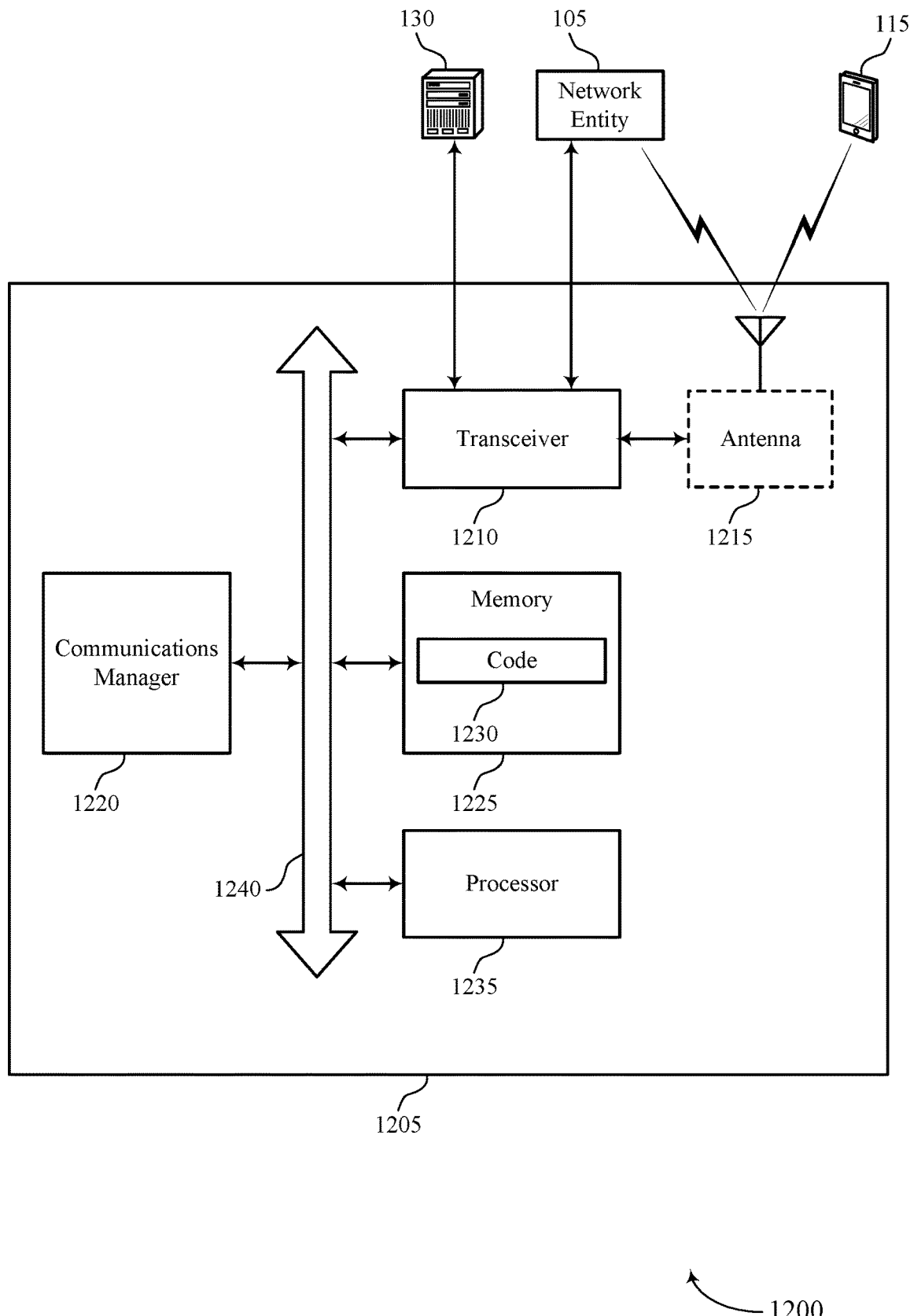
FIG. 12 shows a diagram of a system including a device that supports techniques for CLI reporting trigger conditions in accordance with one or more aspects of the present disclosure.

FIG. 12 shows a diagram of a system 1200 including a device 1205 that supports techniques for CLI reporting trigger conditions in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. The transceiver 1210, or the transceiver 1210 and one or more antennas 1215 or wired interfaces, where applicable, may be an example of a transmitter 915, a transmitter 1015, a receiver 910, a receiver 1010, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting techniques for CLI reporting trigger conditions). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communication at a network entity in accordance with examples as disclosed herein. For example, the communications manager 1220 may be configured as or otherwise support a means for transmitting, to a first UE, control signaling indicating a CLI reporting configuration associated with a set of CLI resources, the set of CLI resources including at least a first CLI resource and a second CLI resource, where the first CLI resource is associated with a first level of CLI and the second CLI resource is associated with a second level of CLI that is less than the first level. The communications manager 1220 may be configured as or otherwise support a means for receiving, from the first UE based on the CLI reporting configuration, a CLI report identifying a CLI resource from the set of CLI resources, where the CLI resource is associated with a CLI measurement that fails to satisfy a CLI threshold, or where the CLI resource is associated with at least the second CLI resource associated with the second level of CLI. The communications manager 1220 may be configured as or otherwise support a means for communicating with the first UE, a second UE, or both, based on the CLI report.

By including or configuring the communications manager 1220 in accordance with examples as described herein, the device 1205 may support techniques which enable victim UEs 115 to report CLI resources that exhibit a sufficiently low level of CLI (e.g., CLI below a threshold), a quantity of least-interfering CLI resources, or both. Techniques for least-interfering CLI reporting may be enabled in addition to, or in the alternate to, other CLI reporting techniques for reporting most-interfering CLI resources. Accordingly, techniques described herein may improve a granularity at which CLI may be reported to the network, thereby providing the network with a more complete and comprehensive picture regarding CLI experienced at the respective UEs 115. Moreover, by enabling UEs 115 to report least-interfering CLI resources, techniques described herein may enable the network to schedule wireless communications at UEs 115 via resources that exhibit sufficiently low levels of CLI performance (e.g., resources that exhibit CLI below some threshold), which may thereby improve an efficiency and reliability of wireless communications performed within the wireless communications system 100.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the processor 1235, the memory 1225, the code 1230, the transceiver 1210, or any combination thereof. For example, the code 1230 may include instructions executable by the processor 1235 to cause the device 1205 to perform various aspects of techniques for CLI reporting trigger conditions as described herein, or the processor 1235 and the memory 1225 may be otherwise configured to perform or support such operations.

Figure 13:
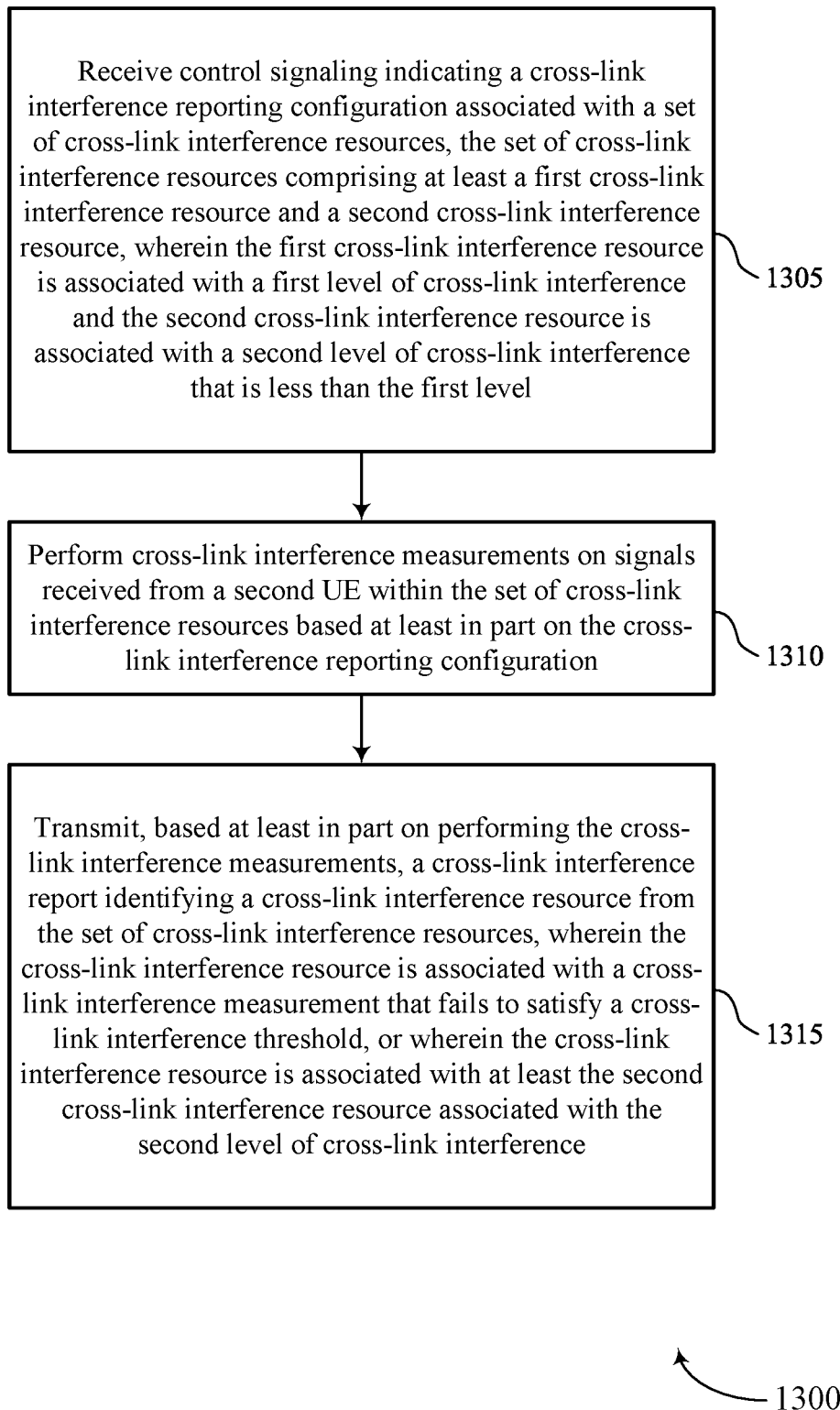
FIGS. 13 through 16 show flowcharts illustrating methods that support techniques for CLI reporting trigger conditions in accordance with one or more aspects of the present disclosure.

FIG. 13 shows a flowchart illustrating a method 1300 that supports techniques for CLI reporting trigger conditions in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving control signaling indicating a CLI reporting configuration associated with a set of CLI resources, the set of CLI resources including at least a first CLI resource and a second CLI resource, where the first CLI resource is associated with a first level of CLI and the second CLI resource is associated with a second level of CLI that is less than the first level. The operations of 1305 may be performed in accordance with examples as disclosed herein. In some examples, aspects of the operations of 1305 may be performed by a control signaling receiving manager 725 as described with reference to FIG. 7.

At 1310, the method may include performing CLI measurements on signals received from a second UE within the set of CLI resources based on the CLI reporting configuration. The operations of 1310 may be performed in accordance with examples as disclosed herein. In some examples, aspects of the operations of 1310 may be performed by a CLI measurement manager 730 as described with reference to FIG. 7.

At 1315, the method may include transmitting, based on performing the CLI measurements, a CLI report identifying a CLI resource from the set of CLI resources, where the CLI resource is associated with a CLI measurement that fails to satisfy a CLI threshold, or where the CLI resource is associated with at least the second CLI resource associated with the second level of CLI. The operations of 1315 may be performed in accordance with examples as disclosed herein. In some examples, aspects of the operations of 1315 may be performed by a CLI report transmitting manager 735 as described with reference to FIG. 7.

Figure 14:
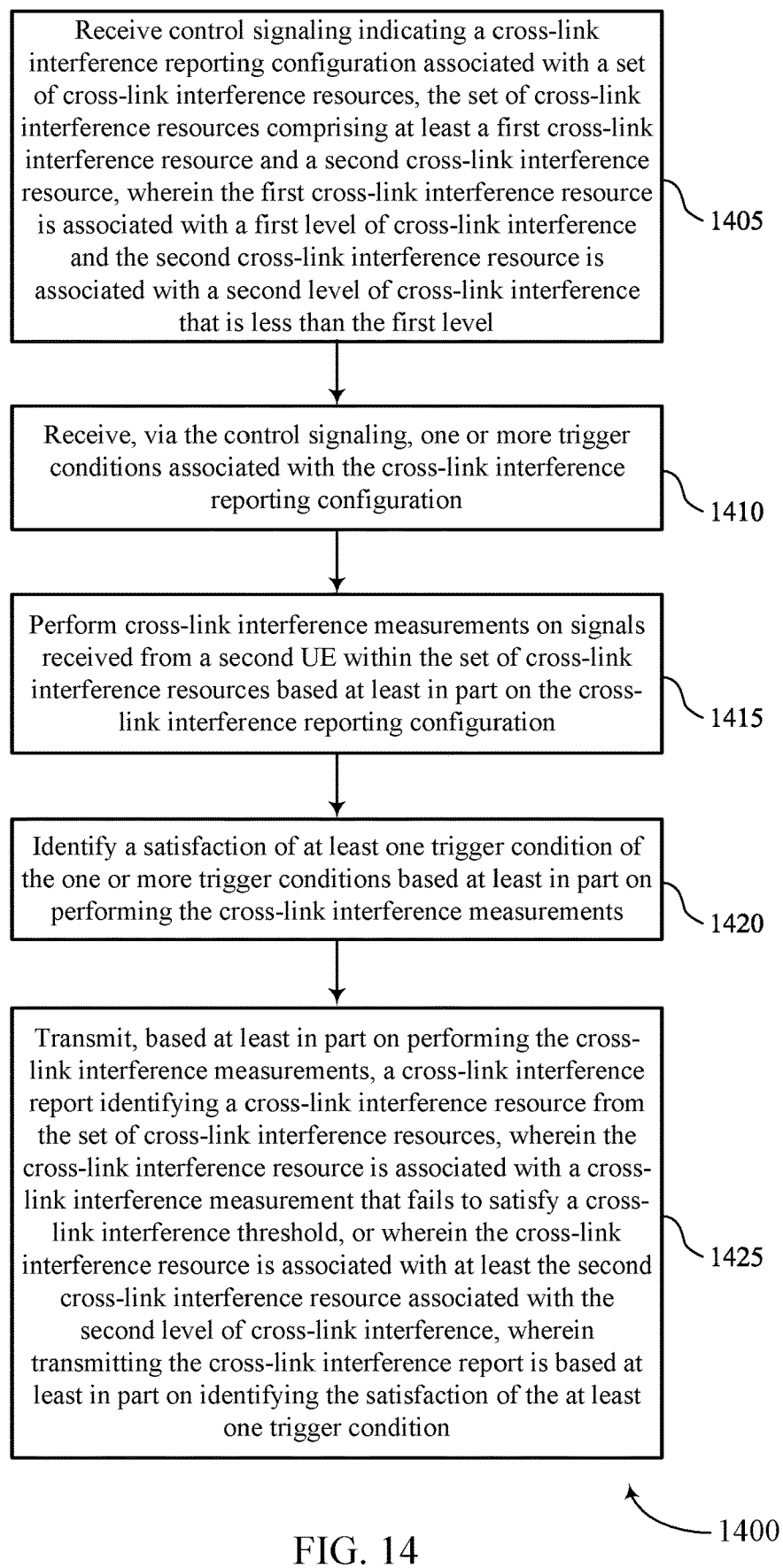

FIG. 14 shows a flowchart illustrating a method 1400 that supports techniques for CLI reporting trigger conditions in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include receiving control signaling indicating a CLI reporting configuration associated with a set of CLI resources, the set of CLI resources including at least a first CLI resource and a second CLI resource, where the first CLI resource is associated with a first level of CLI and the second CLI resource is associated with a second level of CLI that is less than the first level. The operations of 1405 may be performed in accordance with examples as disclosed herein. In some examples, aspects of the operations of 1405 may be performed by a control signaling receiving manager 725 as described with reference to FIG. 7.

At 1410, the method may include receiving, via the control signaling, one or more trigger conditions associated with the CLI reporting configuration. The operations of 1410 may be performed in accordance with examples as disclosed herein. In some examples, aspects of the operations of 1410 may be performed by a control signaling receiving manager 725 as described with reference to FIG. 7.

At 1415, the method may include performing CLI measurements on signals received from a second UE within the set of CLI resources based on the CLI reporting configuration. The operations of 1415 may be performed in accordance with examples as disclosed herein. In some examples, aspects of the operations of 1415 may be performed by a CLI measurement manager 730 as described with reference to FIG. 7.

At 1420, the method may include identifying a satisfaction of at least one trigger condition of the one or more trigger conditions based on performing the CLI measurements. The operations of 1420 may be performed in accordance with examples as disclosed herein. In some examples, aspects of the operations of 1420 may be performed by a trigger condition manager 745 as described with reference to FIG. 7.

At 1425, the method may include transmitting, based on performing the CLI measurements, a CLI report identifying a CLI resource from the set of CLI resources, where the CLI resource is associated with a CLI measurement that fails to satisfy a CLI threshold, or where the CLI resource is associated with at least the second CLI resource associated with the second level of CLI, where transmitting the CLI report is based on identifying the satisfaction of the at least one trigger condition. The operations of 1425 may be performed in accordance with examples as disclosed herein. In some examples, aspects of the operations of 1425 may be performed by a CLI report transmitting manager 735 as described with reference to FIG. 7.

Figure 15:
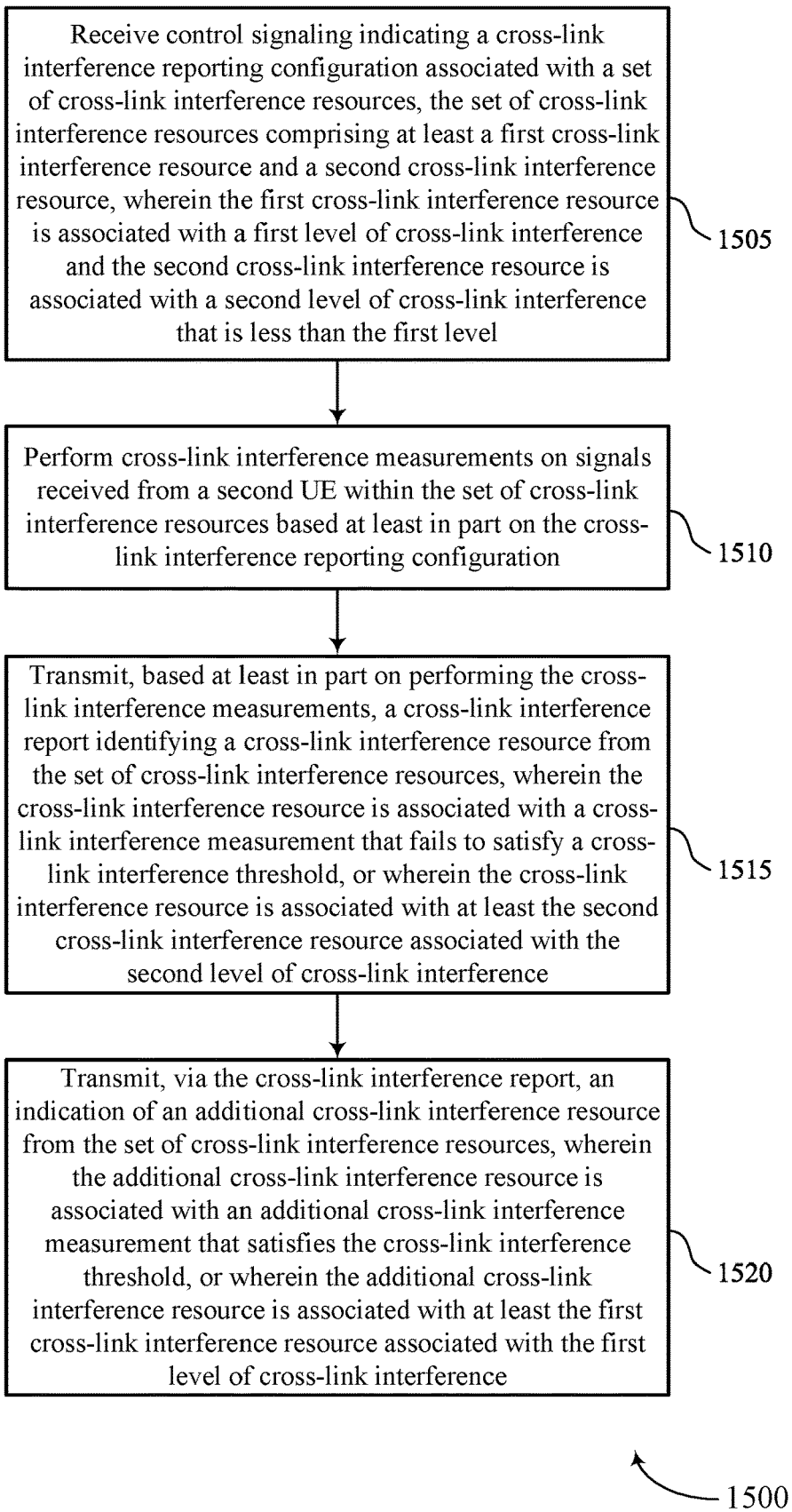

FIG. 15 shows a flowchart illustrating a method 1500 that supports techniques for CLI reporting trigger conditions in accordance with one or more aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1505, the method may include receiving control signaling indicating a CLI reporting configuration associated with a set of CLI resources, the set of CLI resources including at least a first CLI resource and a second CLI resource, where the first CLI resource is associated with a first level of CLI and the second CLI resource is associated with a second level of CLI that is less than the first level. The operations of 1505 may be performed in accordance with examples as disclosed herein. In some examples, aspects of the operations of 1505 may be performed by a control signaling receiving manager 725 as described with reference to FIG. 7.

At 1510, the method may include performing CLI measurements on signals received from a second UE within the set of CLI resources based on the CLI reporting configuration. The operations of 1510 may be performed in accordance with examples as disclosed herein. In some examples, aspects of the operations of 1510 may be performed by a CLI measurement manager 730 as described with reference to FIG. 7.

At 1515, the method may include transmitting, based on performing the CLI measurements, a CLI report identifying a CLI resource from the set of CLI resources, where the CLI resource is associated with a CLI measurement that fails to satisfy a CLI threshold, or where the CLI resource is associated with at least the second CLI resource associated with the second level of CLI. The operations of 1515 may be performed in accordance with examples as disclosed herein.

In some examples, aspects of the operations of 1515 may be performed by a CLI report transmitting manager 735 as described with reference to FIG. 7.

At 1520, the method may include transmitting, via the CLI report, an indication of an additional CLI resource from the set of CLI resources, where the additional CLI resource is associated with an additional CLI measurement that satisfies the CLI threshold, or where the additional CLI resource is associated with at least the first CLI resource associated with the first level of CLI. The operations of 1520 may be performed in accordance with examples as disclosed herein. In some examples, aspects of the operations of 1520 may be performed by a CLI report transmitting manager 735 as described with reference to FIG. 7.

Figure 16:
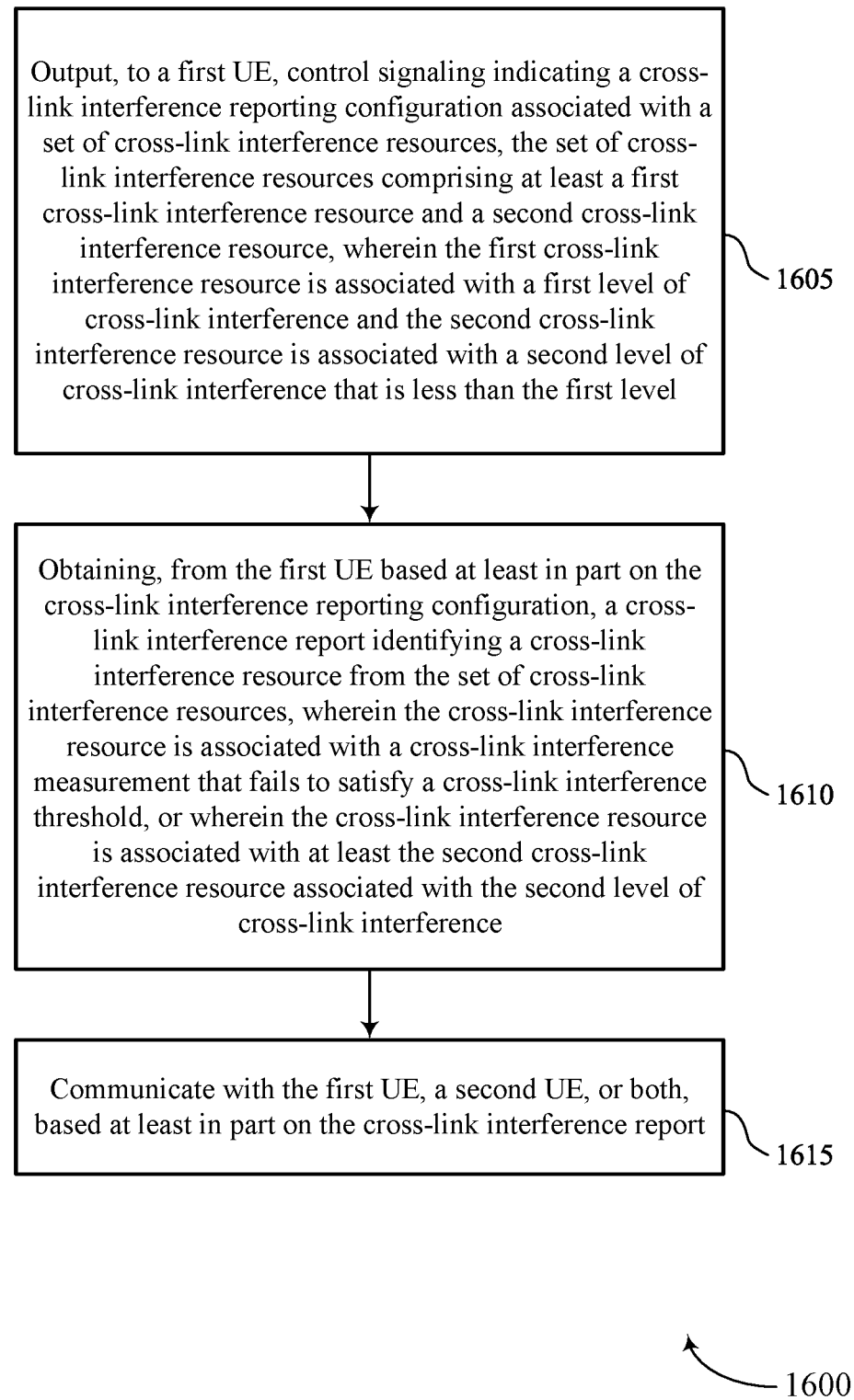

FIG. 16 shows a flowchart illustrating a method 1600 that supports techniques for CLI reporting trigger conditions in accordance with one or more aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1605, the method may include outputting (e.g., transmitting), to a first UE, control signaling indicating a CLI reporting configuration associated with a set of CLI resources, the set of CLI resources including at least a first CLI resource and a second CLI resource, where the first CLI resource is associated with a first level of CLI and the second CLI resource is associated with a second level of CLI that is less than the first level. The operations of 1605 may be performed in accordance with examples as disclosed herein. In some examples, aspects of the operations of 1605 may be performed by a control signaling transmitting manager 1125 as described with reference to FIG. 11.

At 1610, the method may include obtaining (e.g., receiving), from the first UE based on the CLI reporting configuration, a CLI report identifying a CLI resource from the set of CLI resources, where the CLI resource is associated with a CLI measurement that fails to satisfy a CLI threshold, or where the CLI resource is associated with at least the second CLI resource associated with the second level of CLI. The operations of 1610 may be performed in accordance with examples as disclosed herein. In some examples, aspects of the operations of 1610 may be performed by a CLI report receiving manager 1130 as described with reference to FIG. 11.

At 1615, the method may include communicating with the first UE, a second UE, or both, based on the CLI report. The operations of 1615 may be performed in accordance with examples as disclosed herein. In some examples, aspects of the operations of 1615 may be performed by a UE communicating manager 1135 as described with reference to FIG. 11.

The following provides an overview of aspects of the present disclosure:

Aspect 1: A method for wireless communication at a first UE, comprising: receiving control signaling indicating a CLI reporting configuration associated with a set of CLI resources, the set of CLI resources comprising at least a first CLI resource and a second CLI resource, wherein the first CLI resource is associated with a first level of CLI and the second CLI resource is associated with a second level of CLI that is less than the first level; performing CLI measurements on signals received from a second UE within the set of CLI resources based at least in part on the CLI reporting configuration; and transmitting, based at least in part on performing the CLI measurements, a CLI report identifying a CLI resource from the set of CLI resources, wherein the CLI resource is associated with a CLI measurement that fails to satisfy a CLI threshold, or wherein the CLI resource is associated with at least the second CLI resource associated with the second level of CLI.

Aspect 2: The method of aspect 1, further comprising: receiving the CLI threshold via the control signaling, wherein transmitting the CLI report is based at least in part on receiving the CLI threshold.

Aspect 3: The method of any of aspects 1 through 2, further comprising: receiving, via the control signaling, one or more trigger conditions associated with the CLI reporting configuration; and identifying a satisfaction of at least one trigger condition of the one or more trigger conditions based at least in part on performing the CLI measurements, wherein transmitting the CLI report is based at least in part on identifying the satisfaction of the at least one trigger condition.

Aspect 4: The method of aspect 3, further comprising: receiving, via the control signaling, a plurality of transmission occasions associated with the CLI reporting configuration; and transmitting the CLI report within a transmission occasion of the plurality of transmission occasions based at least in part on identifying the satisfaction of the at least one trigger condition.

Aspect 5: The method of any of aspects 1 through 4, further comprising: identifying a satisfaction of a trigger condition for CLI reporting based at least in part on identifying that a CLI measurement is less than or equal to the CLI threshold, wherein the CLI measurement fails to satisfy the CLI threshold based at least in part on being less than or equal to the CLI threshold, wherein transmitting the CLI report is based at least in part on the satisfaction of the trigger condition.

Aspect 6: The method of aspect 5, further comprising: performing additional CLI measurements on signals received from the second UE within the set of CLI resources based at least in part on the CLI reporting configuration; and refraining from transmitting an additional CLI report based at least in part on at least one of the additional CLI measurements being greater than or equal to the CLI threshold, being greater than or equal to an additional CLI threshold, or both.

Aspect 7: The method of any of aspects 1 through 6, wherein the CLI measurements comprise a set of CLI measurements corresponding to respective CLI resources of the set of CLI resources, the method further comprising: transmitting, via the CLI report, an indication of a subset of the set of CLI resources associated with lowest CLI measurements from among the set of CLI measurements, wherein the subset of the set of CLI resources comprises the CLI resource.

Aspect 8: The method of any of aspects 1 through 7, further comprising: transmitting, via the CLI report, an indication of an additional CLI resource from the set of CLI resources, wherein the additional CLI resource is associated with an additional CLI measurement that satisfies the CLI threshold, or wherein the additional CLI resource is associated with at least the first CLI resource associated with the first level of CLI.

Aspect 9: The method of any of aspects 1 through 8, wherein the CLI measurement associated with the CLI resource comprises a lowest CLI measurement from among a plurality of CLI measurements associated with the set of CLI resources.

Aspect 10: The method of any of aspects 1 through 9, further comprising: transmitting an indication of the CLI measurement via the CLI report.

Aspect 11: The method of any of aspects 1 through 10, wherein the CLI resource fails to satisfy the CLI threshold based at least in part on being less than or equal to the CLI threshold.

Aspect 12: The method of any of aspects 1 through 11, wherein the CLI resource spans a set of sub-bands, and the CLI measurement associated with the CLI resource comprises a set of measurements associated with the set of sub-bands, and the CLI measurement fails to satisfy the CLI threshold based at least in part on at least one measurement of the set of measurements failing to satisfy the CLI threshold, failing to satisfy an additional CLI threshold, or both.

Aspect 13: The method of aspect 12, further comprising: transmitting, via the CLI report, an indication of at least one sub-band from the set of sub-bands associated with the at least one measurement based at least in part on the at least one measurement failing to satisfy the CLI threshold, failing to satisfy an additional CLI threshold, or both.

Aspect 14: The method of any of aspects 1 through 13, wherein the CLI resource spans a set of sub-bands, and the CLI measurement associated with the CLI resource comprises a set of measurements associated with the set of sub-bands, and the CLI measurement fails to satisfy the CLI threshold based at least in part on an average of the set of measurements failing to satisfy the CLI threshold.

Aspect 15: The method of any of aspects 1 through 14, further comprising: receiving, via the control signaling, a set of transmission occasions associated with the CLI reporting configuration, wherein the CLI report is transmitted within a transmission occasion of the set of transmission occasions.

Aspect 16: The method of any of aspects 1 through 15, wherein the CLI report is transmitted via L1 signaling.

Aspect 17: The method of any of aspects 1 through 16, wherein the signals received from the second UE comprise SRSs.

Aspect 18: A method for wireless communication at a network entity, comprising: transmitting, to a first UE, control signaling indicating a CLI reporting configuration associated with a set of CLI resources, the set of CLI resources comprising at least a first CLI resource and a second CLI resource, wherein the first CLI resource is associated with a first level of CLI and the second CLI resource is associated with a second level of CLI that is less than the first level; receiving, from the first UE based at least in part on the CLI reporting configuration, a CLI report identifying a CLI resource from the set of CLI resources, wherein the CLI resource is associated with a CLI measurement that fails to satisfy a CLI threshold, or wherein the CLI resource is associated with at least the second CLI resource associated with the second level of CLI; and communicating with the first UE, a second UE, or both, based at least in part on the CLI report.

Aspect 19: The method of aspect 18, further comprising: transmitting the CLI threshold via the control signaling, wherein receiving the CLI report is based at least in part on transmitting the CLI threshold.

Aspect 20: The method of any of aspects 18 through 19, further comprising: transmitting, via the control signaling, one or more trigger conditions associated with the CLI reporting configuration, wherein receiving the CLI report is based at least in part on a satisfaction of at least one trigger condition of the one or more trigger conditions.

Aspect 21: The method of aspect 20, further comprising: transmitting, via the control signaling, a plurality of transmission occasions associated with the CLI reporting configuration; and receiving the CLI report within a transmission occasion of the plurality of transmission occasions based at least in part on the satisfaction of the at least one trigger condition.

Aspect 22: The method of any of aspects 18 through 21, further comprising: receiving the CLI report based at least in part on a satisfaction of a trigger condition for CLI reporting, wherein the satisfaction of the trigger condition is based at least in part on the CLI measurement being less than or equal to the CLI threshold, wherein the CLI measurement fails to satisfy the CLI threshold based at least in part on being less than or equal to the CLI threshold.

Aspect 23: The method of any of aspects 18 through 22, wherein the CLI measurement is included within a set of CLI measurements corresponding to respective CLI resources of the set of CLI resources, the method further comprising: receiving, via the CLI report, an indication of a subset of the set of CLI resources associated with lowest CLI measurements from among the set of CLI measurements, wherein the subset of CLI resources includes the CLI resource.

Aspect 24: The method of any of aspects 18 through 23, further comprising: receiving, via the CLI report, an indication of an additional CLI resource from the set of CLI resources, wherein the additional CLI resource is associated with an additional CLI measurement that satisfies the CLI threshold, or wherein the additional CLI resource is associated with at least the first CLI resource associated with the first level of CLI.

Aspect 25: The method of any of aspects 18 through 24, wherein the CLI measurement associated with the CLI resource comprises a lowest CLI measurement from among a plurality of CLI measurements associated with the set of CLI resources.

Aspect 26: The method of any of aspects 18 through 25, further comprising: receiving an indication of the CLI measurement via the CLI report.

Aspect 27: The method of any of aspects 18 through 26, wherein the CLI resource fails to satisfy the CLI threshold based at least in part on being less than or equal to the CLI threshold.

Aspect 28: The method of any of aspects 18 through 27, wherein the CLI resource spans a set of sub-bands, and the CLI measurement associated with the CLI resource comprises a set of measurements associated with the set of sub-bands, and the CLI measurement fails to satisfy the CLI threshold based at least in part on at least one measurement of the set of measurements failing to satisfy the CLI threshold, failing to satisfy an additional CLI threshold, or both.

Aspect 29: The method of aspect 28, further comprising: receiving, via the CLI report, an indication of at least one sub-band from the set of sub-bands associated with the at least one measurement based at least in part on the at least one measurement failing to satisfy the CLI threshold, failing to satisfy an additional CLI threshold, or both.

Aspect 30: The method of any of aspects 18 through 29, wherein the CLI resource spans a set of sub-bands, and the CLI measurement associated with the CLI resource comprises a set of measurements associated with the set of sub-bands, and the CLI measurement fails to satisfy the CLI threshold based at least in part on an average of the set of measurements failing to satisfy the CLI threshold.

Aspect 31: The method of any of aspects 18 through 30, further comprising: transmitting, via the control signaling, a set of transmission occasions associated with the CLI reporting configuration, wherein the CLI report is received within a transmission occasion of the set of transmission occasions.

Aspect 32: The method of any of aspects 18 through 31, wherein the CLI report is received via L1 signaling.

Aspect 33: An apparatus for wireless communication at a first UE, comprising a processor; memory coupled with the processor; and instructions stored in the memory and executable by the processor to cause the apparatus to perform a method of any of aspects 1 through 17.

Aspect 34: An apparatus for wireless communication at a first UE, comprising at least one means for performing a method of any of aspects 1 through 17.

Aspect 35: A non-transitory computer-readable medium storing code for wireless communication at a first UE, the code comprising instructions executable by a processor to perform a method of any of aspects 1 through 17.

Aspect 36: An apparatus for wireless communication at a network entity, comprising a processor; memory coupled with the processor; and instructions stored in the memory and executable by the processor to cause the apparatus to perform a method of any of aspects 18 through 32.

Aspect 37: An apparatus for wireless communication at a network entity, comprising at least one means for performing a method of any of aspects 18 through 32.

Aspect 38: A non-transitory computer-readable medium storing code for wireless communication at a network entity, the code comprising instructions executable by a processor to perform a method of any of aspects 18 through 32.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first user equipment (UE), comprising:
   one or more processors;
   one or more memories coupled with the one or more processors; and
   instructions stored in the one or more memories and executable by the one or more processors to cause the apparatus to:
      receive control signaling indicating a cross-link interference reporting configuration associated with a set of cross-link interference resources, the set of cross-link interference resources comprising at least a first cross-link interference resource and a second cross-link interference resource, wherein the first cross-link interference resource is associated with a first level of cross-link interference and the second cross-link interference resource is associated with a second level of cross-link interference that is less than the first level;
      perform cross-link interference measurements on signals received from a second UE within the set of cross-link interference resources based at least in part on the cross-link interference reporting configuration; and
      transmit, based at least in part on performing the cross-link interference measurements, a cross-link interference report comprising an identifier of a cross-link interference resource from the set of cross-link interference resources, wherein the cross-link interference resource is associated with a cross-link interference measurement that fails to satisfy a cross-link interference threshold, or wherein the cross-link interference resource is associated with at least the second cross-link interference resource associated with the second level of cross-link interference.

2. The apparatus of claim 1, wherein the instructions are further executable by the one or more processors to cause the apparatus to:
   receive the cross-link interference threshold via the control signaling, wherein transmitting the cross-link interference report is based at least in part on receiving the cross-link interference threshold.

3. The apparatus of claim 1, wherein the instructions are further executable by the one or more processors to cause the apparatus to:
   receive, via the control signaling, one or more trigger conditions associated with the cross-link interference reporting configuration; and
   identify that the cross-link interference resource satisfies at least one trigger condition of the one or more trigger conditions based at least in part on performing the cross-link interference measurements, wherein transmitting the cross-link interference report is based at least in part on identifying the cross-link interference resource satisfies the at least one trigger condition.

4. The apparatus of claim 3, wherein the instructions are further executable by the one or more processors to cause the apparatus to:
   receive, via the control signaling, a plurality of transmission occasions associated with the cross-link interference reporting configuration; and
   transmit the cross-link interference report within a transmission occasion of the plurality of transmission occasions based at least in part on identifying the cross-link interference resource satisfies the at least one trigger condition.

5. The apparatus of claim 1, wherein the instructions are further executable by the one or more processors to cause the apparatus to:
   identify a satisfaction of a trigger condition for cross-link interference reporting based at least in part on identifying that a cross-link interference measurement is less than or equal to the cross-link interference threshold, wherein the cross-link interference measurement fails to satisfy the cross-link interference threshold based at least in part on being less than or equal to the cross-link interference threshold, wherein transmitting the cross-link interference report is based at least in part on the satisfaction of the trigger condition.

6. The apparatus of claim 5, wherein the instructions are further executable by the one or more processors to cause the apparatus to:
   perform additional cross-link interference measurements on signals received from the second UE within the set of cross-link interference resources based at least in part on the cross-link interference reporting configuration; and
   refrain from transmitting an additional cross-link interference report based at least in part on at least one of the additional cross-link interference measurements being greater than or equal to the cross-link interference threshold, being greater than or equal to an additional cross-link interference threshold, or both.

7. The apparatus of claim 1, wherein the cross-link interference measurements comprise a set of cross-link interference measurements corresponding to respective cross-link interference resources of the set of cross-link interference resources, and the instructions are further executable by the one or more processors to cause the apparatus to:
    transmit, via the cross-link interference report, an indication of a subset of the set of cross-link interference resources associated with lowest cross-link interference measurements from among the set of cross-link interference measurements, wherein the subset of the set of cross-link interference resources comprises the cross-link interference resource.

8. The apparatus of claim 1, wherein the instructions are further executable by the one or more processors to cause the apparatus to:
    transmit, via the cross-link interference report, an indication of an additional cross-link interference resource from the set of cross-link interference resources, wherein the additional cross-link interference resource is associated with an additional cross-link interference measurement that satisfies the cross-link interference threshold, or wherein the additional cross-link interference resource is associated with at least the first cross-link interference resource associated with the first level of cross-link interference.

9. The apparatus of claim 1, wherein the cross-link interference measurement associated with the cross-link interference resource comprises a lowest cross-link interference measurement from among a plurality of cross-link interference measurements associated with the set of cross-link interference resources.

10. The apparatus of claim 1, wherein the instructions are further executable by the one or more processors to cause the apparatus to:
    transmit an indication of the cross-link interference measurement via the cross-link interference report.

11. The apparatus of claim 1, wherein the cross-link interference resource fails to satisfy the cross-link interference threshold based at least in part on being less than or equal to the cross-link interference threshold.

12. The apparatus of claim 1, wherein the cross-link interference resource spans a set of sub-bands, and wherein the cross-link interference measurement associated with the cross-link interference resource comprises a set of measurements associated with the set of sub-bands, and wherein the cross-link interference measurement fails to satisfy the cross-link interference threshold based at least in part on at least one measurement of the set of measurements failing to satisfy the cross-link interference threshold, failing to satisfy an additional cross-link interference threshold, or both.

13. The apparatus of claim 12, wherein the instructions are further executable by the one or more processors to cause the apparatus to:
    transmit, via the cross-link interference report, an indication of at least one sub-band from the set of sub-bands associated with the at least one measurement based at least in part on the at least one measurement failing to satisfy the cross-link interference threshold, failing to satisfy an additional cross-link interference threshold, or both.

14. The apparatus of claim 1, wherein the cross-link interference resource spans a set of sub-bands, and wherein the cross-link interference measurement associated with the cross-link interference resource comprises a set of measurements associated with the set of sub-bands, and wherein the cross-link interference measurement fails to satisfy the cross-link interference threshold based at least in part on an average of the set of measurements failing to satisfy the cross-link interference threshold.

15. The apparatus of claim 1, wherein the instructions are further executable by the one or more processors to cause the apparatus to:
    receive, via the control signaling, a set of transmission occasions associated with the cross-link interference reporting configuration, wherein the cross-link interference report is transmitted within a transmission occasion of the set of transmission occasions.

16. The apparatus of claim 1, wherein the cross-link interference report is transmitted via Layer one signaling.

17. The apparatus of claim 1, wherein the signals received from the second UE comprise sounding reference signals.

18. An apparatus for wireless communication at a network entity, comprising:
    one or more processors;
    one or more memories coupled with the one or more processors; and
    instructions stored in the one or more memories and executable by the one or more processors to cause the apparatus to:
        output, to a first user equipment (UE), control signaling indicating a cross-link interference reporting configuration associated with a set of cross-link interference resources, the set of cross-link interference resources comprising at least a first cross-link interference resource and a second cross-link interference resource, wherein the first cross-link interference resource is associated with a first level of cross-link interference and the second cross-link interference resource is associated with a second level of cross-link interference that is less than the first level;
        obtain, from the first UE based at least in part on the cross-link interference reporting configuration, a cross-link interference report comprising an identifier of a cross-link interference resource from the set of cross-link interference resources, wherein the cross-link interference resource is associated with a cross-link interference measurement that fails to satisfy a cross-link interference threshold, or wherein the cross-link interference resource is associated with at least the second cross-link interference resource associated with the second level of cross-link interference; and
        communicate with the first UE, a second UE, or both, based at least in part on the cross-link interference report.

19. The apparatus of claim 18, wherein the instructions are further executable by the one or more processors to cause the apparatus to:
    output the cross-link interference threshold via the control signaling, wherein receiving the cross-link interference report is based at least in part on transmitting the cross-link interference threshold.

20. The apparatus of claim 18, wherein the instructions are further executable by the one or more processors to cause the apparatus to:
    output, via the control signaling, one or more trigger conditions associated with the cross-link interference reporting configuration, wherein obtaining the cross-link interference report is based at least in part on the cross-link interference resource satisfying at least one trigger condition of the one or more trigger conditions.

21. The apparatus of claim 20, wherein the instructions are further executable by the one or more processors to cause the apparatus to:

output, via the control signaling, a plurality of transmission occasions associated with the cross-link interference reporting configuration; and
obtain the cross-link interference report within a transmission occasion of the plurality of transmission occasions based at least in part on the cross-link interference resource satisfying the at least one trigger condition.

22. The apparatus of claim 18, wherein the instructions are further executable by the one or more processors to cause the apparatus to:
obtain the cross-link interference report based at least in part on a satisfaction of a trigger condition for CLI reporting, wherein the satisfaction of the trigger condition is based at least in part on the cross-link interference measurement being less than or equal to the cross-link interference threshold, wherein the cross-link interference measurement fails to satisfy the cross-link interference threshold based at least in part on being less than or equal to the cross-link interference threshold.

23. The apparatus of claim 18, wherein the cross-link interference measurement is included within a set of cross-link interference measurements corresponding to respective cross-link interference resources of the set of cross-link interference resources, and the instructions are further executable by the one or more processors to cause the apparatus to:
obtain, via the cross-link interference report, an indication of a subset of the set of cross-link interference resources associated with lowest cross-link interference measurements from among the set of cross-link interference measurements, wherein the subset of the set of cross-link interference resources includes the cross-link interference resource.

24. The apparatus of claim 18, wherein the instructions are further executable by the one or more processors to cause the apparatus to:
obtain, via the cross-link interference report, an indication of an additional cross-link interference resource from the set of cross-link interference resources, wherein the additional cross-link interference resource is associated with an additional cross-link interference measurement that satisfies the cross-link interference threshold, or wherein the additional cross-link interference resource is associated with at least the first cross-link interference resource associated with the first level of cross-link interference.

25. The apparatus of claim 18, wherein the cross-link interference measurement associated with the cross-link interference resource comprises a lowest cross-link interference measurement from among a plurality of cross-link interference measurements associated with the set of cross-link interference resources.

26. The apparatus of claim 18, wherein the instructions are further executable by the one or more processors to cause the apparatus to:
obtain an indication of the cross-link interference measurement via the cross-link interference report.

27. The apparatus of claim 18, wherein the cross-link interference resource fails to satisfy the cross-link interference threshold based at least in part on being less than or equal to the cross-link interference threshold.

28. The apparatus of claim 18, wherein the cross-link interference resource spans a set of sub-bands, wherein the cross-link interference measurement associated with the cross-link interference resource comprises a set of measurements associated with the set of sub-bands, and wherein the cross-link interference measurement fails to satisfy the cross-link interference threshold based at least in part on at least one measurement of the set of measurements failing to satisfy the cross-link interference threshold, failing to satisfy an additional cross-link interference threshold, or both.

29. A method for wireless communication at a first user equipment (UE), comprising:
receiving control signaling indicating a cross-link interference reporting configuration associated with a set of cross-link interference resources, the set of cross-link interference resources comprising at least a first cross-link interference resource and a second cross-link interference resource, wherein the first cross-link interference resource is associated with a first level of cross-link interference and the second cross-link interference resource is associated with a second level of cross-link interference that is less than the first level;
performing cross-link interference measurements on signals received from a second UE within the set of cross-link interference resources based at least in part on the cross-link interference reporting configuration; and
transmitting, based at least in part on performing the cross-link interference measurements, a cross-link interference report comprising an identifier of a cross-link interference resource from the set of cross-link interference resources, wherein the cross-link interference resource is associated with a cross-link interference measurement that fails to satisfy a cross-link interference threshold, or wherein the cross-link interference resource is associated with at least the second cross-link interference resource associated with the second level of cross-link interference.

30. A method for wireless communication at a network entity, comprising:
outputting, to a first user equipment (UE), control signaling indicating a cross-link interference reporting configuration associated with a set of cross-link interference resources, the set of cross-link interference resources comprising at least a first cross-link interference resource and a second cross-link interference resource, wherein the first cross-link interference resource is associated with a first level of cross-link interference and the second cross-link interference resource is associated with a second level of cross-link interference that is less than the first level;
obtaining, from the first UE based at least in part on the cross-link interference reporting configuration, a cross-link interference report comprising an identifier of a cross-link interference resource from the set of cross-link interference resources, wherein the cross-link interference resource is associated with a cross-link interference measurement that fails to satisfy a cross-link interference threshold, or wherein the cross-link interference resource is associated with at least the second cross-link interference resource associated with the second level of cross-link interference; and
communicating with the first UE, a second UE, or both, based at least in part on the cross-link interference report.

* * * * *